US008625424B2

(12) United States Patent
Jaeger

(10) Patent No.: US 8,625,424 B2
(45) Date of Patent: Jan. 7, 2014

(54) METHOD AND SYSTEM FOR ROUTING INFORMATION IN A NETWORK

(75) Inventor: Morten Gravild Bjerregaard Jaeger, Phuket (TH)

(73) Assignee: HP Ventures A/S (DK)

( * ) Notice: Subject to any disclaimer, the term of this patent is extended or adjusted under 35 U.S.C. 154(b) by 212 days.

(21) Appl. No.: 13/033,464

(22) Filed: Feb. 23, 2011

(65) Prior Publication Data

US 2012/0213227 A1   Aug. 23, 2012

(51) Int. Cl.
H04J 1/16 (2006.01)
(52) U.S. Cl.
USPC .......................................... 370/231; 709/223
(58) Field of Classification Search
USPC ................ 370/225, 229, 231, 254, 338, 392; 709/206, 221, 223, 225
See application file for complete search history.

(56) References Cited

U.S. PATENT DOCUMENTS

| 7,082,135 | B2 | 7/2006 | Gebhardt, Jr. et al. | |
| 7,603,418 | B1* | 10/2009 | Xu | 709/206 |
| 2003/0069614 | A1* | 4/2003 | Bowman et al. | 607/60 |
| 2004/0193090 | A1* | 9/2004 | Lebel et al. | 604/1 |
| 2004/0213274 | A1 | 10/2004 | Fan et al. | |
| 2005/0157698 | A1 | 7/2005 | Park et al. | |
| 2006/0098608 | A1* | 5/2006 | Joshi | 370/338 |
| 2006/0291404 | A1* | 12/2006 | Thubert et al. | 370/254 |
| 2007/0127503 | A1 | 6/2007 | Zhao | |
| 2007/0192451 | A1* | 8/2007 | Tran et al. | 709/223 |
| 2007/0233835 | A1* | 10/2007 | Kushalnagar et al. | 709/223 |
| 2008/0186907 | A1 | 8/2008 | Yagyuu et al. | |
| 2009/0296704 | A1 | 12/2009 | Kim et al. | |
| 2012/0036237 | A1* | 2/2012 | Hasha et al. | 709/221 |

FOREIGN PATENT DOCUMENTS

| EP | 2109228 A1 | 10/2009 |
| WO | 99/55031 A1 | 10/1999 |
| WO | 2011/001211 A1 | 1/2011 |

OTHER PUBLICATIONS

Extended Search Report, European Patent Application No. 11173409.1, May 16, 2012, 8 pages.
Neumann, A., et al., "Better Approach to Mobile Ad-hoc Networking (B.A.T.M.A.N.)," Network Working Group, Internet-Draft, Apr. 7, 2008, 24 pages.

* cited by examiner

*Primary Examiner* — Hassan Phillips
*Assistant Examiner* — Ajay Cattungal
(74) *Attorney, Agent, or Firm* — Lewis, Rice & Fingersh, L.C.

(57) ABSTRACT

A method and system for determining an optimal route from a node to a given sink node in a network is described. Sink node periodically transmits routing information containing an indicator of recency. This indicator of recency is periodically updated. Routing information is received by a plurality of nodes in the network. Each node receiving routing information compares the indicator of recency contained in the routing information with an indicator of recency stored at the node to determine whether the received routing information is more recent than the stored routing information. An optimal route to the sink node is determined based on this comparison. Each node also periodically transmits routing information based on stored routing information to other nodes.

20 Claims, 20 Drawing Sheets

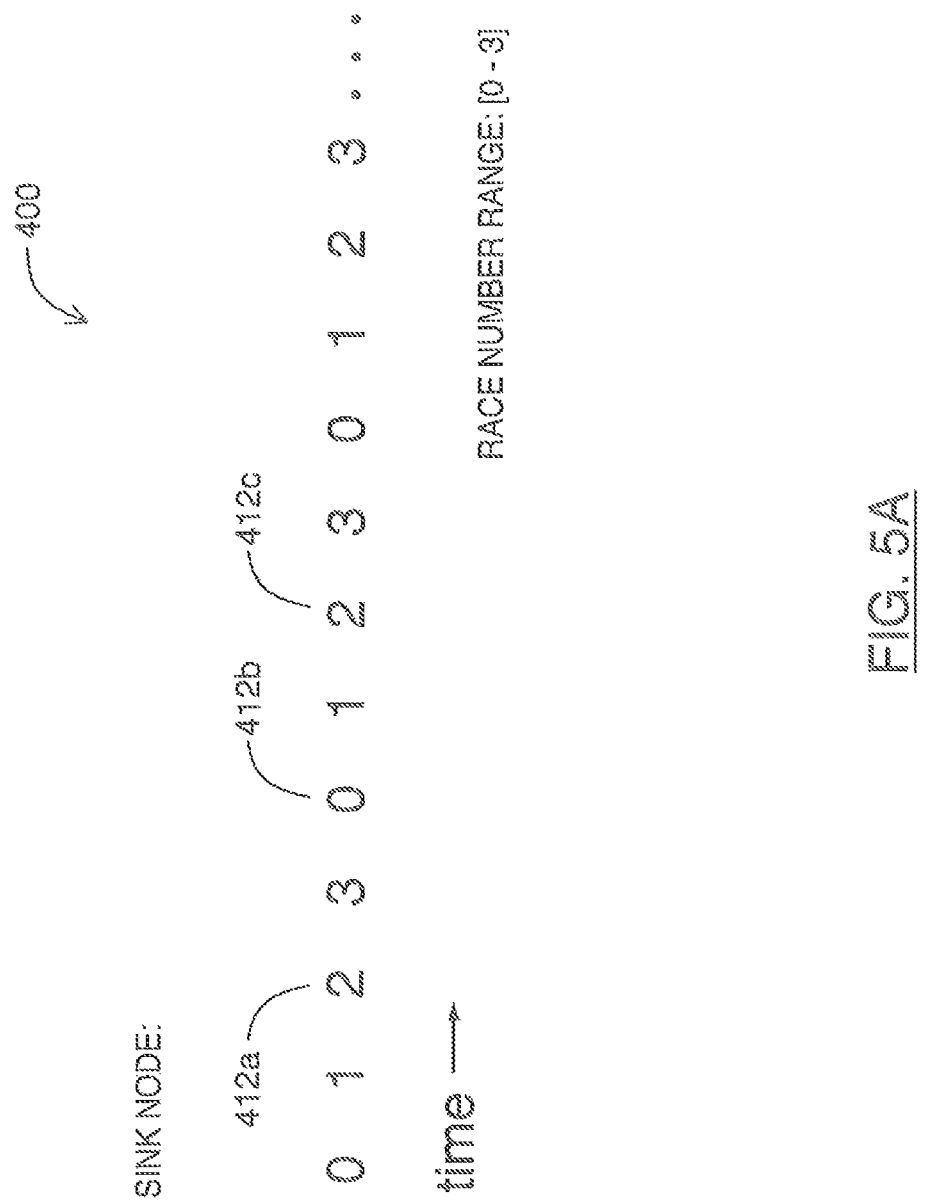

| Number of Nodes | Length of Route | | | | | | | | | | |
|---|---|---|---|---|---|---|---|---|---|---|---|
| | 12 | 14 | 16 | 18 | 20 | 22 | 24 | 26 | 28 | 30 |
| 1 | 0.3872 | 0.3953 | 0.4018 | 0.4073 | 0.4119 | 0.4159 | 0.4194 | 0.4225 | 0.4253 | 0.4278 |
| 2 | 0.1938 | 0.212 | 0.2272 | 0.2403 | 0.2517 | 0.2617 | 0.2706 | 0.2786 | 0.2858 | 0.2923 |
| 3 | 0.073 | 0.0898 | 0.1052 | 0.1189 | 0.1316 | 0.1431 | 0.1537 | 0.1635 | 0.1725 | 0.1808 |
| 4 | 0.0193 | 0.0287 | 0.0384 | 0.0481 | 0.0577 | 0.0669 | 0.0758 | 0.0843 | 0.0925 | 0.1002 |
| 5 | 0.0032 | 0.0065 | 0.0106 | 0.0154 | 0.0207 | 0.0262 | 0.032 | 0.0378 | 0.0436 | 0.0494 |
| 6 | 0.0002 | 0.0009 | 0.0021 | 0.0038 | 0.0059 | 0.0085 | 0.0113 | 0.0145 | 0.0178 | 0.0214 |

METHOD AND SYSTEM FOR ROUTING INFORMATION IN A NETWORK

FIELD

The embodiments described herein relate to a method and system for routing information in a network.

BACKGROUND

Routing protocols define how routers disseminate information to other routers in order for any router to determine a route from itself to a number of destinations, or sinks in a network. When a node sends a message to a destination node, the message typically traverses a route from the node to the destination node through one or more intermediary nodes. Each intermediary node typically keeps a table containing: (a) destination nodes and (b) the neighboring node to which the intermediary node should send the message if the intermediary node receives a message destined for the destination node.

To determine what the next neighboring node should be, some traditional routing protocols require each node to keep track of the topology of the network, and/or some sort of metric as to the quality of a route through the neighboring node (e.g., the number of hops to the destination node, link quality, etc.)

SUMMARY

The embodiments described herein provide in one aspect, a method for determining the optimal route between a node and a sink node, the method comprising: sending routing information from a sink node at a periodic interval, the routing information comprising an indicator of recency and allowing identification of the sink node; sending routing information from each of a plurality of nodes at a periodic interval, the routing information being based on stored routing information at each of the plurality of nodes; repeatedly receiving routing information at any node able to receive routing information; determining at each node receiving routing information whether the received routing information is more recent than stored routing information at the node; and if the received routing information at a node is more recent than the stored routing information, storing the received routing information at the node.

The routing information stored at each node is used to indicate an optimal route to one or more sink nodes of the network.

The embodiments described herein provide in another aspect, a system for establishing a route in a network, the system comprising: a plurality of nodes, each node comprising: a node memory; and a node processor, the node processor configured to: send routing information at a periodic interval, the routing information being based on information stored in the node memory; receive routing information; determine whether the received routing information is more recent than the stored routing information at the node; and if the received routing information is more recent than stored routing information, to store the received routing information in the node memory; wherein at least one of the nodes is a sink node, the processor of the sink node further configured to: send routing information at a periodic interval, the routing information comprising an indicator of recency and allowing identification of the sink node.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which:

FIG. 5A is a schematic diagram illustrating the sequential flow of race numbers from the perspective of one example sink node having a race number value range of 0 to 3;

FIG. 9 is a table illustrating results from a binominal distribution calculation for determining the probability of wait times for routes of varying lengths;

DETAILED DESCRIPTION

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

The embodiments of the systems and methods described herein may be implemented in hardware or software, or a combination of both. However, preferably, these embodiments are implemented in computer programs executable on programmable computers each comprising at least one processor, a data storage system (including volatile and non-volatile memory and/or storage elements) and units for sending and receiving routing information and data over a network. For example and without limitation, the programmable computers may be any device containing one or more computational devices in the form of a microprocessor or a microcontroller, a personal computer, laptop, personal data assistant, and cellular telephone. In some embodiments, the computers can include dedicated sensor units, which will be described in further detail below.

Figure 1:
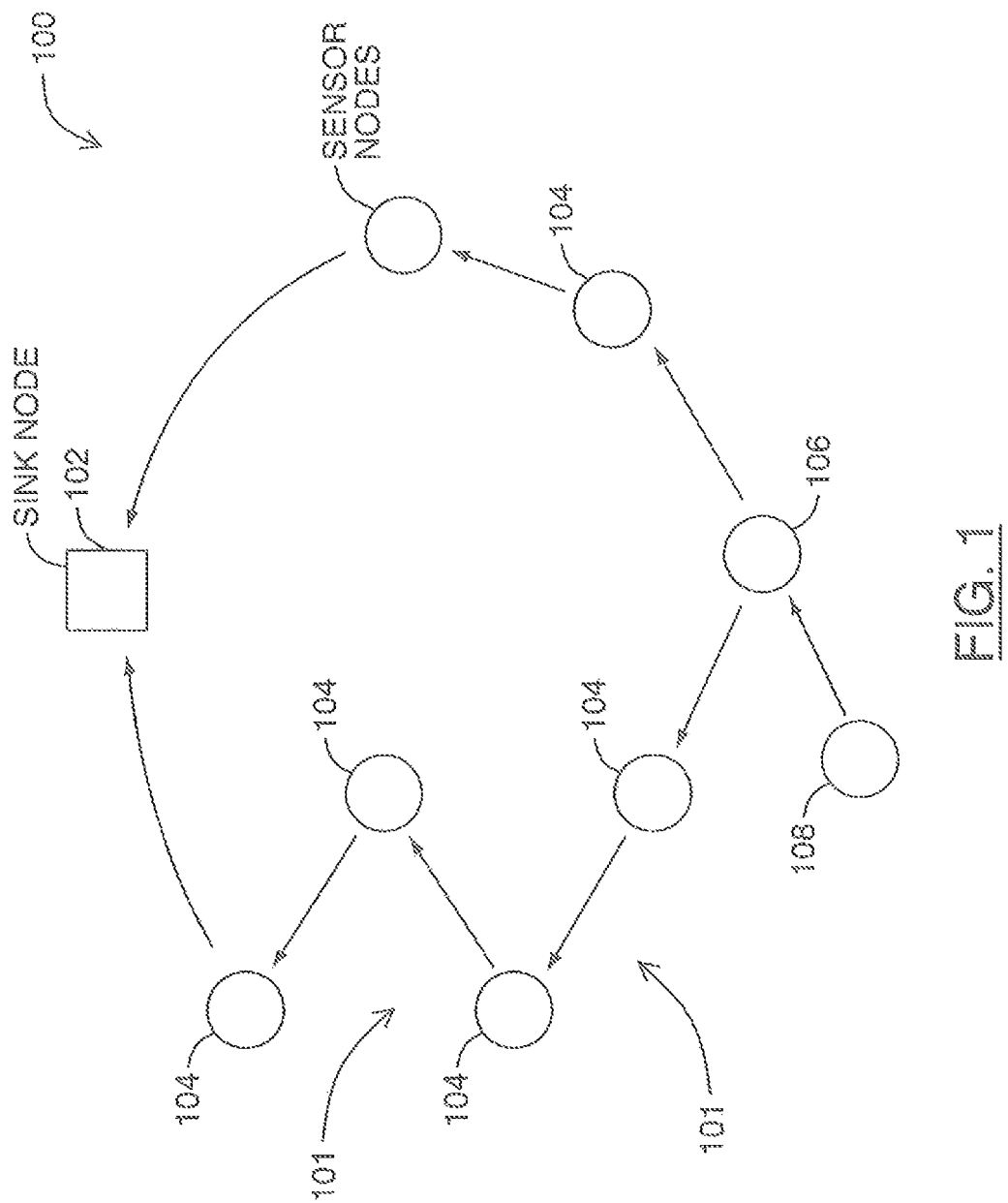
FIG. 1 is a schematic illustration of an example network topology layout.

Referring to FIG. 1, therein illustrated is an example network layout. In the example embodiment, the network layout may be for that of a sensor network, shown generally as 100. There may be one or more sink nodes 102 and one or more sensor nodes 104. Each sink node 102 may be operable to receive data sent from the sensor nodes 104. The data sent from a given sensor node 104 may be routed through one or more other sensor nodes 104 or even a sink node 102. It will be understood that sensor nodes 104 may act as data gathering nodes that gather data, in addition to acting as "routing" nodes. Data gathering is presented as an example only. The nodes of the network may perform any other function in addition to performing the essential task of acting as a "routing" node and routing data. It will be understood that sink nodes also perform the task of routing data.

It will be understood that although the described embodiments are being described with respect to sensor networks, the embodiments may also be applicable to non-sensor network topologies. For example, the embodiments may be applicable to data routed through routers used for the Internet or other suitably connected devices for routing information communicated between sink nodes.

In some embodiments, a sink node 102 may have more processing power and, larger capacity than non-sink nodes 104. Sink nodes may also be operatively connected to other devices through a physical network, or through a wireless network, or by other connections through which the messages received from the non-sink nodes 104 may be relayed. In one embodiment, a sink node 102 may alternatively contain larger storage facilities to store data received from non-sink nodes 104 to only periodically relay the data collected from the non-sink nodes 104 to devices or media unrelated to the sensor network as such. Such relaying may be performed through a periodic connection to a network, and/or through a physical downloading of data through periodic physical maintenance.

Each node in the network may be operable to gather data from physical environments in which they are placed. For example, nodes may be deployed in a physical environment such as a forest for collecting environmental data regarding meteorological phenomenon such as precipitation. Nodes may typically contain transceivers for transmitting the contents of such data to the sink nodes 102, and for routing information destined for sink nodes 102 from other non-sink nodes 104, or even from sink nodes 102.

Non-sink nodes 104 typically have limited computing resources both in terms of processing power and the amount of memory. Moreover, any node will typically have to meet harsh low power requirements because of limits in terms of its power source, which could include, but would not be limited to electrical power from chemical reactions, solar cells, capacitive electrical storage, piezo electric power, power generated by magnetic inductance and combinations thereof.

Any node may be deployed in a way, or located under circumstances, that may inconvenience the upgrade, replacement or replenishment of any parts or resources used during the operation, or consumed by the operation of the node. For example, they may be embedded into buildings behind cement walls, or be deployed randomly in a forest in such a manner that they are difficult to physically locate. Accordingly, it is advantageous for nodes to employ a method of routing information that requires minimal computational (processing and memory) and power resources. Such objectives may be achieved by reducing the amount of data required for the computation of routes and thereby reducing the amount of data that is stored at each node for the routing protocol, and/or by reducing the size of the routing information so that the transceiver may be in operation for a reduced period of time (i.e., having the effect of minimizing power requirements). In addition, in various embodiments described herein, such objectives are further achieved by not using routing protocols with a larger-than-linear computational complexity.

Referring back to FIG. 1, a line joining two nodes denotes a connection or link 101 between two neighbor nodes. In some embodiments two neighbor nodes may be wired together. In other embodiments, in a wireless network, neighbor nodes are nodes that are located within range of each other, such that each neighbor node is able to receive data transmitted from the other neighbor nodes.

The interconnection of nodes causes some nodes to have a choice of multiple routes when attempting to transmit data to a given sink node. Referring back to FIG. 1, for example, non-sink node 106 has three neighbor nodes with which it can send and receive data. Two of these neighbor nodes are along routes that lead to the sink node 102. The third neighbor node is non-sink node 108, which is only connected to the sink node 102 through node 106. It will be appreciated that non-sink node 108 is the worst choice for routing data from node 106 to the sink node. One of the other neighbor nodes is located along a route to the sink node consisting of four non-sink nodes. The third neighbor node is located on a route consisting of two non-sink nodes. Normally, the shortest route is the fastest route. However, it will be understood by those of ordinary skill in the art that the route containing the lowest number of non-sink nodes is not necessarily always the fastest route. For example, a link along the route consisting of two sink nodes may fail from time to time to the effect that it sometimes is faster to route data through the longer route. Therefore, evaluating the speed of a route simply by evaluating the number of nodes along a route may not always be adequate. It is the object of the present invention to describe a method for a node to determine a fastest route from the node to a given sink node in a network, especially one in which the network topology may change dynamically.

Figure 2:
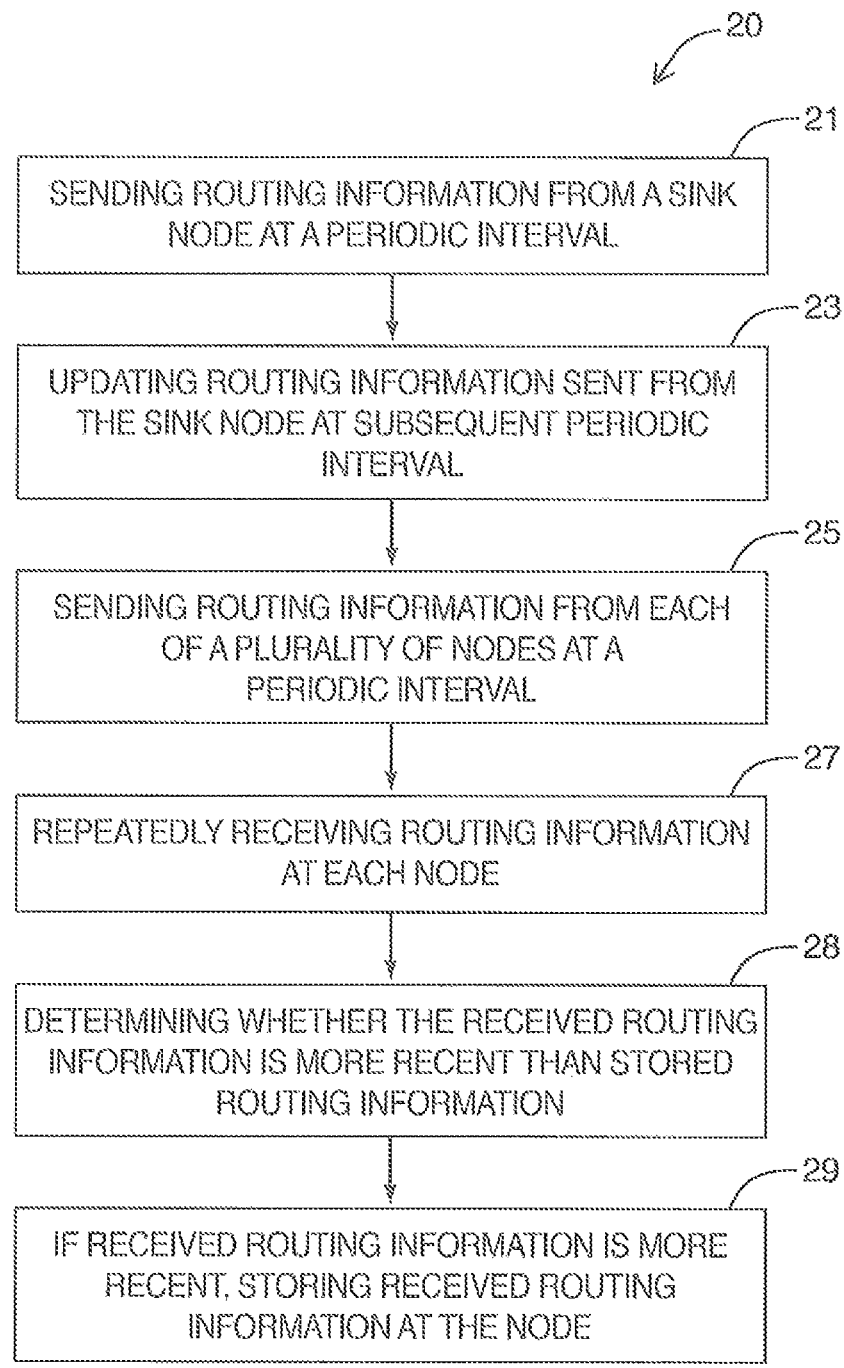
FIG. 2 is a flowchart that illustrates the steps of a method for determining a route in a network.

Referring now to FIG. 2, a flowchart illustrates the steps of the method 20 of the present invention for determining a route in a network. At step 21, each sink node 102 sends routing information at a periodic interval. This routing information will be used by nodes to determine the fastest route from the node to the sink node. In one embodiment, the routing information is broadcast to all neighbor nodes. The routing information may include a sink node identifier to identify the sink node. When a sink node identifier is not included, the routing information is structured in a way that allows for the identification of the sink node. The routing information additionally includes an indicator of recency. This indicator is used by the nodes when comparing received routing information to stored routing information, to determine whether received routing information is more recent than the stored routing information. In one embodiment, this indicator is a race number. This indicator of recency may also be implemented in other ways, such as a time stamp.

At step 23, each sink node updates the routing information it sends at each subsequent periodic interval by changing the indicator of recency contained in the routing information. This update is made to indicate that the routing information sent in one period is more recent than routing information sent in previous periods.

At step 25, each node sends routing information at a periodic interval. In one embodiment, the routing information is broadcast to all neighbor nodes. Therefore while each sink node is sending routing information at a periodic interval, each other node of the network, including each other sink node, is also sending its own routing information at a periodic interval. Routing information sent by a node is based on stored routing information stored at the node at the moment the routing information is sent. This routing information may comprise one or more sink node identifiers to identify one or more sink nodes and one or more indicators of recency, each indicator corresponding to a sink node identified in the routing information. Where sink node identifiers are not included, the routing information is structured in a way that allows for the identification of each sink node.

Since sink nodes also route data, each sink node also performs step 25 wherein routing information is sent at a periodic interval, and wherein the routing information sent is based on stored routing information stored at the sink node at the moment routing information is sent. Likewise, this routing information may comprise one or more sink node identifiers to identify one or more sink nodes and one or more indicators of recency, each indicator corresponding to a sink node identified in the routing information. Furthermore, where sink node identifiers are not included, the routing information is structured in a way that allows for the identification of each sink node. The sending of routing information at this step 25 may include the sending of routing information of step 21.

Whereas each non-sink node always sends routing information that is the same as its stored routing information, each sink node is different in that it updates the routing information by changing the indicator of recency corresponding to itself at the step 23 before sending routing information at step 25. It will be understood that each sink node sends routing information corresponding to other sink nodes based on its stored routing information.

Each node receiving routing information must be able to identify the neighbor node that sent the routing information. Knowing the identity of this neighbor node becomes important when each node has to route data at a future time. Identification and addressing of the neighbor node may be done by a plurality of means. For example, a neighbor node may be identified using a unique serial number assigned to each node by the manufacturer of the node. Node identifiers may also be assigned by other means known in the art. The node identifier used in any practical method of identifying a neighbor node is herein referred to as a "node ID".

At step 27, routing information sent by a node at step 25 is received by neighbor nodes of the sending node. A node receives one transmission of routing information from each neighbor node per periodic interval. Where a node has a plurality of neighbor nodes, the node will repeatedly receive routing information from the neighbor nodes within about one periodic interval.

At step 28, each node receiving routing information compares the indicator of recency contained in the received routing information against the indicator of recency corresponding to the given sink node contained in the stored routing information that each node has stored, in order to determine whether the received routing information is more recent than the stored routing information. As described below, this comparison of indicators of recency and storing of received routing information is the process by which the node determines a fastest route to a given sink node.

At step 29, if the routing information received at the node is more recent than the stored routing information corresponding to a given sink node, then the node replaces its stored routing information with the received routing information.

As discussed above, each node stores routing information. This stored routing information comprises one or more sink node identifiers and one or more indicators of recency. Each indicator of recency corresponds to one sink node identifier that the node has stored and indicates the recency of the routing information stored for that sink node. Additionally, the stored routing information comprises one or more neighbor node IDs. Each sink node identifier is mapped to one neighbor node ID stored at the node.

When a node wishes to route data to a given sink node, it finds the sink node identifier for that sink node and the corresponding neighbor node ID to which the given sink node is mapped. The node then routes data to the neighbor node with this node ID.

It will be understood that when a node receives routing information that it determines to be more recent, it stores this received routing information without modifying it. Furthermore, when the node sends routing information based on this stored routing information, it does not modify the stored routing information in its transmission of routing information. Therefore, even if routing information sent by a sink node at step 21 may have been received and re-sent by several other nodes, the routing information will still include the same indicator of recency as was originally included in the routing information sent from the sink node.

The nodes of the network are configured to have periodic intervals of approximately equal durations. Nodes preferably do not send routing information at the same time because two or more neighbor nodes simultaneously sending routing information may cause a collision. Several methods exist to solve this problem. For example, if the interval of time that the transmission of routing information occupies is short in comparison to the period with which the transmissions recur, a solution in this case can be for each node to choose a random start time for the periodic interval, as collisions will then happen infrequently. For the purposes of this description of the present invention, it is assumed that a media access protocol is chosen such that collisions occur infrequently and can thus be ignored. It is further assumed that each node transmits routing information at different times from its neighbors.

Since nodes send routing information at different times, a node receiving routing information from a first node must wait until the arrival of its next periodic interval before sending routing information to neighbor nodes. The time waited at each node is herein referred to as a "node wait time".

The lower limit of the duration of this node wait time will approximate 0 units of time (where the non-sink node receives routing information immediately before the arrival of its periodic interval such that it sends routing information almost instantaneously after receiving the routing information). The upper limit will approximate p, where p is the duration of a full period between two transmissions of routing information (where the non-sink node receives routing information immediately after having sent routing information such that it must wait a full period before sending more routing information). In some embodiments the start time of the periods are chosen at random, and can in these cases, and for the purpose of analysis, be seen as stochastic events. For the purpose of further treatment node wait times at each node are considered as having a duration of the average node wait time, $$\frac{1}{2}p.$$

It will be further appreciated that along a route comprising n links, the time that will pass between the time a sink node first sends routing information with a specific indicator of recency and the time the node furthest away from the sink node along the route receives routing information containing this same indicator of recency is given by:

$$t_{tr} = \frac{1}{2}np \qquad 52.1$$

where $t_{tr}$ is herein referred to as the travel time.

It will then be appreciated that along a route made up of fewer nodes, routing information containing a specific indicator of recency will take less time to reach the furthest node when none of the links along that route fail. In the method where the sink node is updating routing information at a periodic interval, a node receiving routing information that is more recent than some other information will have received the more recent information over a faster route. Therefore, when a node stores the most recent routing information for a given sink node and the neighbor node ID from which this routing information was transmitted, that node is storing the ID of the neighbor node that represents the fastest route to that given sink node. When the node wants to route data to this sink node, the node will route data to the neighbor node having the ID contained in this stored routing information.

Furthermore, when the network topology changes, for example, when links fail, for instance due to changing RF conditions, due to nodes failing or due to the movement of mobile nodes, a node may cease receiving routing information that is more recent from its neighbor node along a first route. Instead, the node will receive routing information that is more recent from nodes along another route. This other route may contain more nodes than the first route, but may be a faster route due to failed links on the first route. By receiving routing information from the nodes along the alternative path, and storing this routing information along with the neighbor node ID, the node is effectively updating its stored routing information to reflect the change in the network. As will be understood by those skilled in the art, the dynamic nature of the route selection is particularly well suited to mobile networks where, as nodes move about, conditions change and new routes are formed while old routes may disappear. The dynamic nature of the route selection continually allows the fastest route to be selected.

Figure 3A:
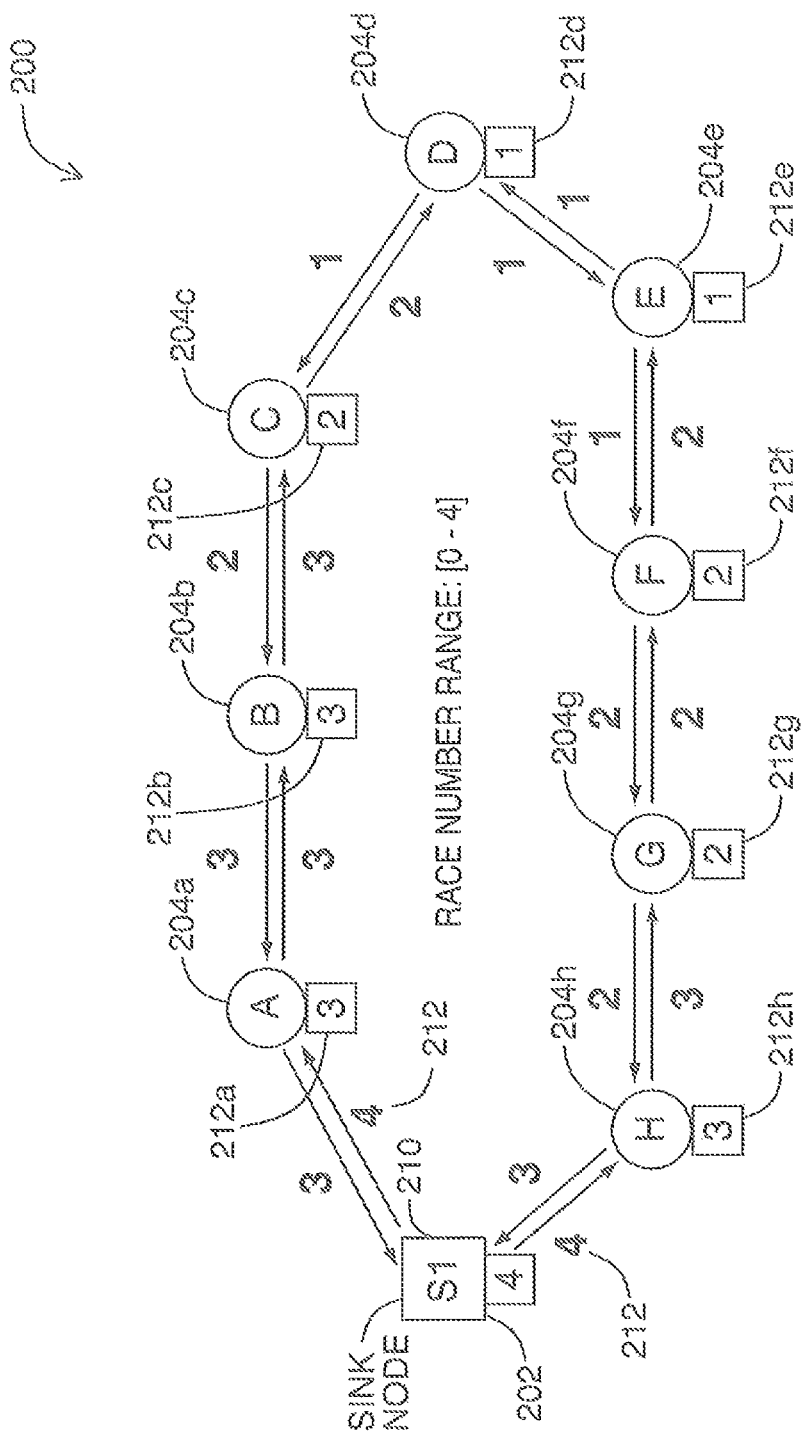
FIG. 3A is a schematic diagram illustrating the sequential flow of routing information containing race numbers from a sink node to non-sink nodes in an example network topology.

Referring to FIG. 3A, therein illustrated is a schematic diagram of an example operation of the routing protocol. The network 200 of FIG. 3A has a ring topology containing one sink node 202 and eight non-sink nodes 204a, 204b, 204c, 204d, 204e, 204f, 204g, and 204h (i.e., nodes A, B, C, D, E, F, G, and H, respectively.) Since this network has a ring topology, each node only has two neighbors. For example, sink node 202 has non-sink nodes 204a and 204h as neighbors. It will be understood that the ring topology is for example purposes and any suitable number of sink nodes, non-sink nodes and network topology may be employed to practice the described embodiment. Particularly, it will also be understood that all nodes may be mobile and that network topologies may change frequently.

The sink node 202 of the network of FIG. 3A sends routing information in which race numbers, defined below, are being used as indicators of the recency of the routing information. The sink node 202 is incrementing race numbers at each periodic interval. Therefore routing information containing a greater race number is considered to be more recent than routing information containing a lesser race number.

Each node of the network 200 sends routing information at a periodic interval. This is illustrated by the arrows pointing outwardly from the sink node 202 and each non-sink node 204. Since in a ring topology such as the one of network 200, each node has only two neighbor nodes, routing information is sent to only these two neighbor nodes. Each node also receives routing information from its two neighbor nodes. This is illustrated by the two arrows point inwardly towards each node.

FIG. 3A shows the race numbers 212 contained in routing information being sent from each node and the race numbers (212a through 212h respectively) stored by the non-sink nodes in one period. The race numbers are shown at a stage where they are being transmitted between nodes, but have not yet been compared to the race number contained in stored routing information stored at each node. Race number 212 having the value "4" indicates that routing information being sent from sink node 202 to neighbor non-sink nodes 204a and 204h contains a race number having the value "4". Non-sink nodes 204a and 204h each have stored routing information having race numbers 212a and 212h with the value "3". This is the race number contained in routing information sent by the sink node in a previous period. As non-sink nodes 204a and 204h receive the most recent routing information from sink node 202, each node will determine that the received routing information is more recent than the stored routing information. As a result, each node 204a and 204h will update their respective stored routing information so that the race number stored has the value "4".

A node receiving routing information compares the race number 212 included in the received routing information against the race number included in the stored routing information to determine whether the received routing information is more recent than the stored routing information. If the received routing information is more recent, the non-sink node 204 updates its race number of the stored routing information with race number 212 of the received routing information.

Non-sink nodes that are not neighbors to the sink node 202 have smaller race number values (212b, 212c, 212d, 212e, 212*f*, 212*g*), which indicate that the routing information stored by these nodes are not as recent. It will be appreciated that a non-sink node located along a longer route from the sink node 202, a route which has more neighbor nodes between it and the sink node, stores a lesser race number indicating that the routing information stored at the node is less recent. For example, non-sink node 204*d*, which is located along the longest routes from sink node 202 has the least race number 212*d* stored.

Figure 3B:
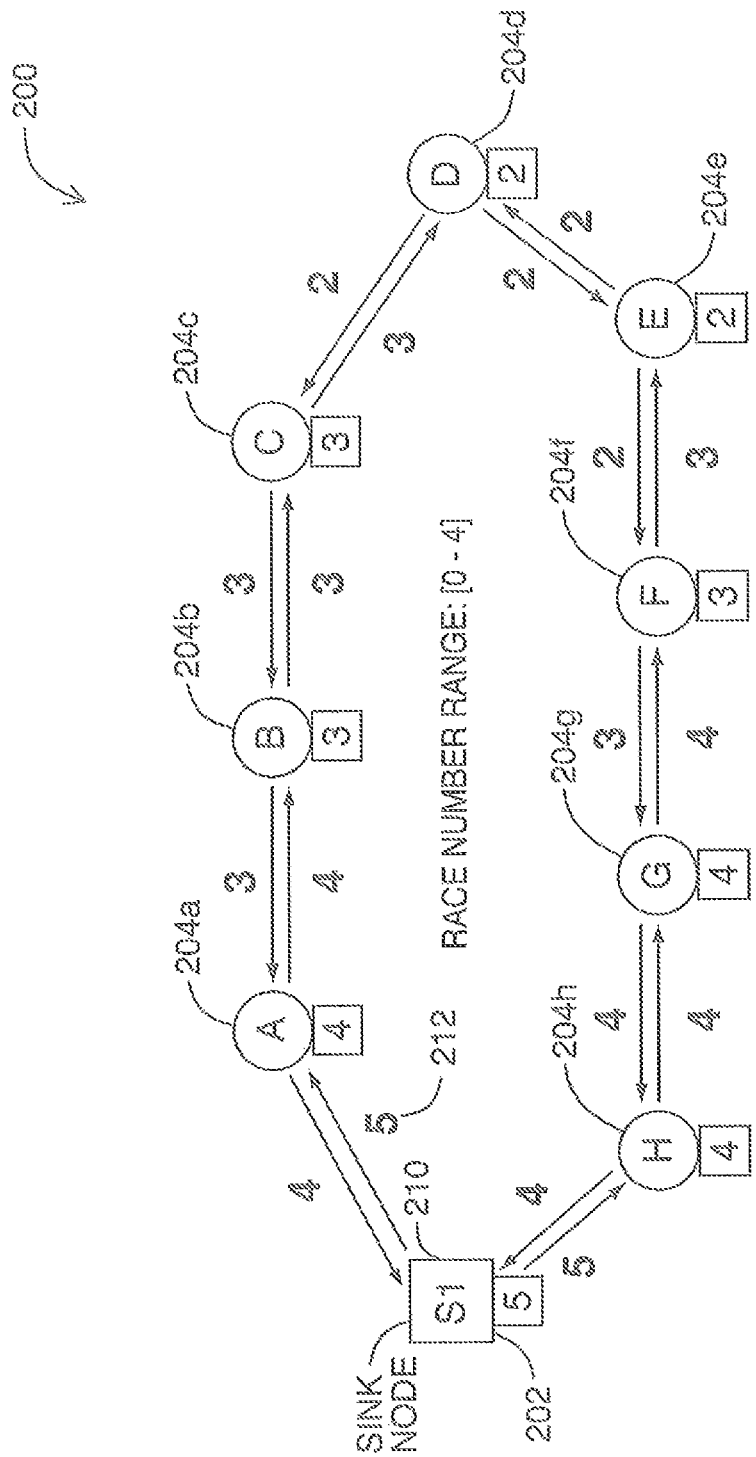
FIG. 3B is a schematic diagram illustrating the sequential flow of routing information containing race numbers from a sink node to non-sink nodes, one periodic interval after the state shown in FIG. 3A.

Referring now to FIG. 3B, the network 200 is illustrated at a later periodic interval. Sink node 202 has updated the routing information by incrementing by one the race number of this routing information. Each non-sink node has now received routing information from its neighbor nodes and stored the more recent routing information. Importantly, it will be appreciated that non-sink node 204*d* receives routing information from both non-sink nodes 204*c* and 204*e*. It will be further appreciated that non-sink node 204*c* represents the shorter, and in this case faster, route from non-sink node 204*d* to sink node 202. Non-sink node 204*d* already has stored routing information containing a race number with the value '2'. When it receives routing information from non-sink node 204*e* containing a race number with the value '2', it will determine that the received routing information is not more recent than the stored routing information and therefore will not store the received routing information. Therefore non-sink node 204*d* correctly maintains that the fastest route from it to the sink node 202 is through non-sink node 204*c*.

Figure 3C:
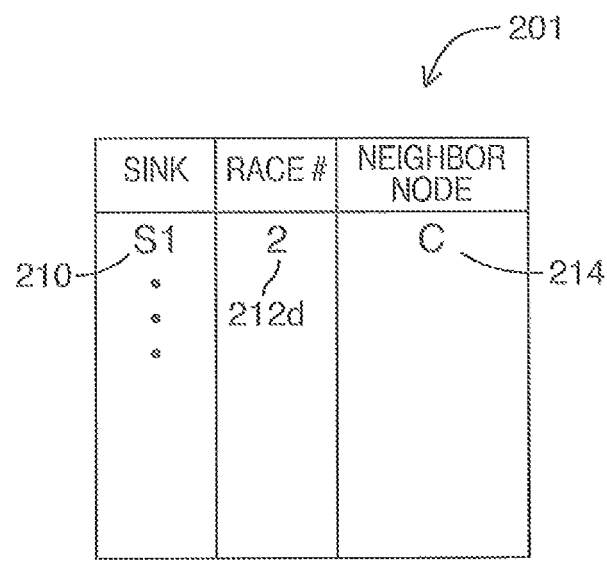
FIG. 3C illustrates an example routing table that contains routing information stored at a non-sink node.

Referring briefly to FIG. 3C, therein illustrated is the stored routing information of a non-sink node. For illustrative purposes, the stored routing information 201 has been presented in a table. The routing information 201 contains a sink node identifier 210, the race number 212*d* indicating the recency of the stored routing information corresponding to the sink node identified by the sink node identifier 210, and a neighbor node identifier 214 indicating the node from which the stored routing information was received. The neighbor node identifier 214 may be a node ID or a node address. This routing table 201 maps a sink node identifier 210 to a neighbor node identifier 214.

In this example, the routing table of non-sink node 204*d* is shown. It contains stored routing information indicating that in order to reach sink node 202 with sink node identifier 'S1' through the fastest route, the non-sink node should route data through neighbor node C. When non-sink node 204*d* receives routing information containing sink node identifier 'S1' with a more recent indicator of recency, for example race number with value '3', as in FIG. 3B, non-sink node 204*d* stores the received routing information along with the neighbor node identifier from which the routing information was received, thereby overwriting previously stored routing information. In the example shown in FIG. 3B, the most recent routing information received by non-sink node 204*d* is still from non-sink node 204*c*. Therefore, subsequent to receiving routing information containing race numbers from nodes 204*c* and 204*e*, as illustrated in FIG. 3B, and comparing the race numbers received with the race number contained in the stored routing information, non-sink node 204*d* maintains the 'C' as the neighbor node identifier entry, but updates its stored routing information with a new race number entry. It will be appreciated that a neighbor node may store routing information for more than one sink node in a network comprising a plurality of sink nodes. For example, non-sink node 204*d* may have additional entries for sink nodes with the IDs 'S2', 'S3' and so on.

Figure 3D:
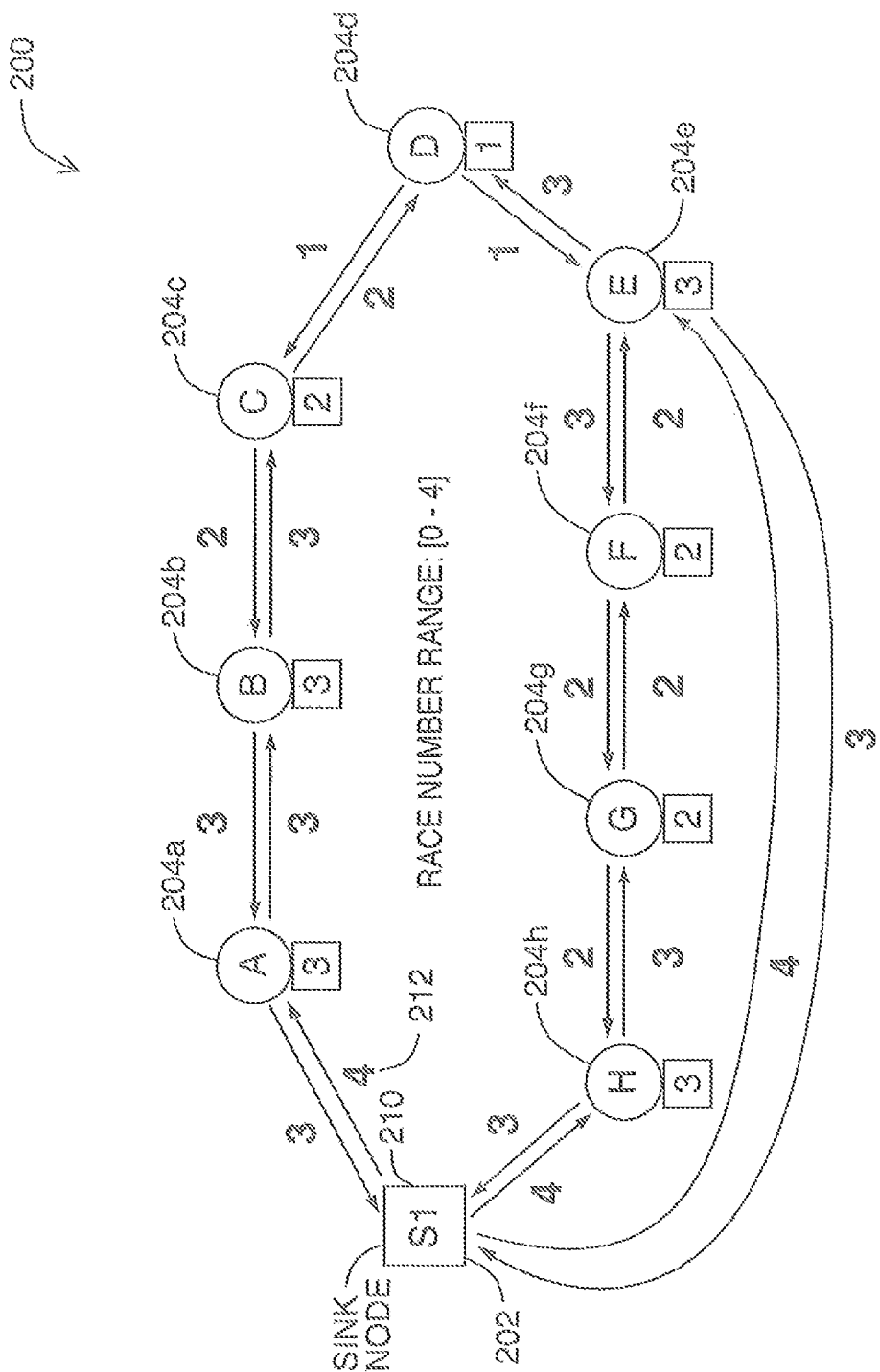
FIG. 3D is a schematic diagram illustrating the sequential flow of routing information containing race numbers from a sink node to non-sink node when a new and faster route is available, in an example network topology.

Reference is now made to FIG. 3D, which shows the network of FIGS. 3A and 3B with a new link connecting sink node 202 to non-sink node 204*e*. This new link may be created if, for example, non-sink node 204*e* is a mobile node and has moved to come within range of sink node 202 while still being in range of neighbor non-sink nodes 204*f* and 204*d*. In this example, before receiving more recent routing information from non-sink node 204*e*, non-sink node 204*f* had stored routing information containing a race number having the value '2', which was received from non-sink node 204*g*. The stored routing information of non-sink node 204*f* indicated that the fastest route to sink node 202 was through neighbor non-sink node 204*g*. When non-sink node 204*f* receives routing information containing a race number having the value '3' from non-sink node 204*e*, it will determine that this routing information is more recent. By storing this received routing information along with neighbor node identifier 'E', non-sink node 204*f* has effectively discovered the new faster route through non-sink node 204*e* to sink node 202.

The example in FIG. 3D demonstrates how the steps of the method for determining a route in a network may be applied in a dynamically changing network. In one situation, a link between two neighbor nodes may fail temporarily such that one node cannot receive transmissions sent from the other node for some duration of time. Such failures may occur due to intermittent increases in RF noise or network congestion. A node may also be disconnected temporarily for maintenance before being reconnected. In a network containing mobile nodes, a node may for example move out of range of some neighbor nodes, and then move back within range. Instead of detecting a failure, a node relies on receiving more recent routing information from one of its other neighbor nodes in order to discover faster routes to a given sink node. Therefore, by performing the same steps of the method described above, a non-sink node can overcome the problem of a failure in a link between two neighbor nodes.

Figure 4A:
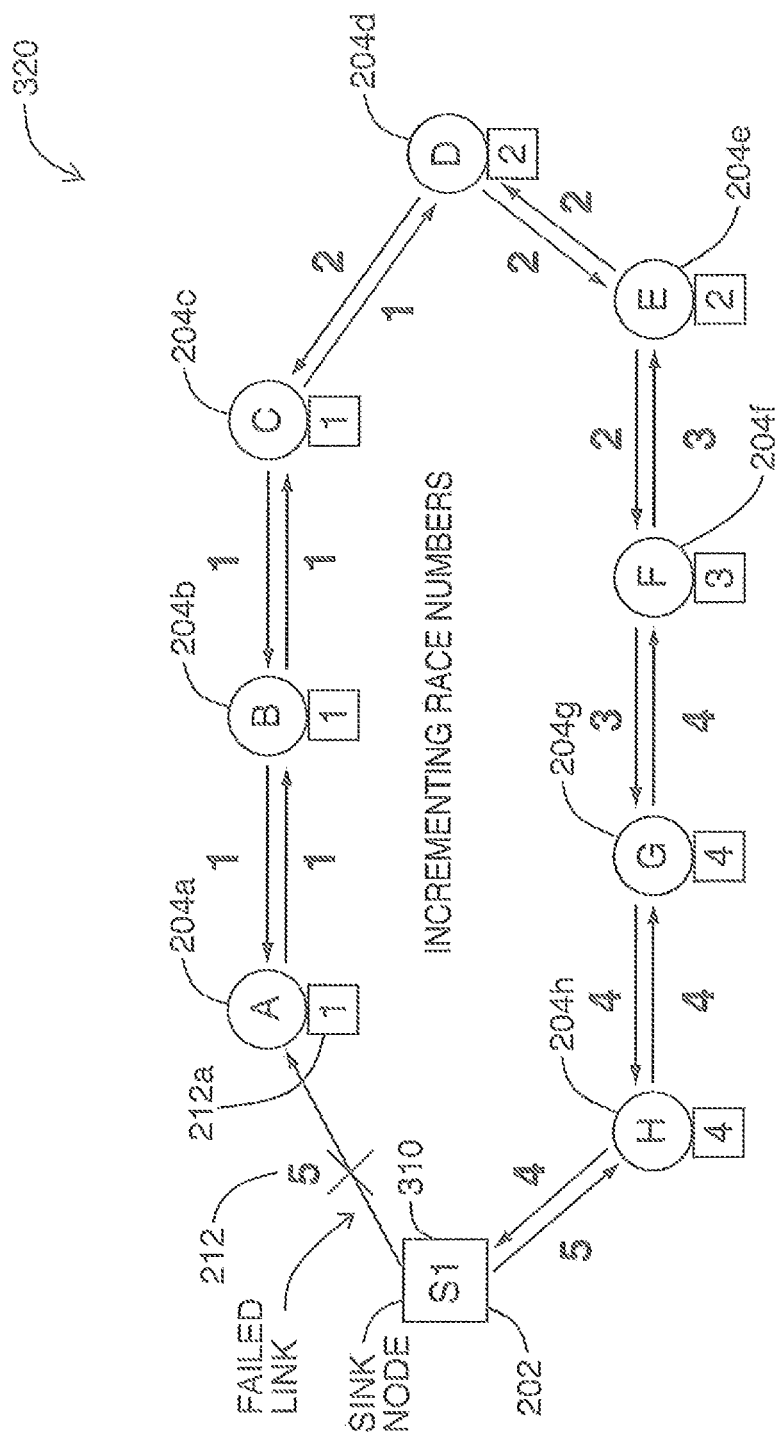
FIG. 4A is a schematic diagram illustrating the sequential flow of routing information containing race numbers from a sink node to a non-sink node in an example network topology wherein links between neighbor nodes occasionally fail.

Reference is now made to FIG. 4A, which illustrates a similar topology to that of FIG. 3A and generally indicated as 320. FIG. 4A illustrates the case where there is a failure in the link between sink node 202 and non-sink node 204*a*. The failure has occurred right after node 204*a* receives from sink node 202 routing information containing a race number with the value of '1'. As can be seen from FIG. 4A, each of the non-sink nodes 204*h*, 204*g*, 204*f*, and 204*e* (with neighbor node IDs 'H', 'G', 'F', and 'E', respectively) continue to transmit routing information containing race numbers such that more recent routing information are propagated along the route formed by those nodes to non-sink node 204*d*. Since non-sink node 204*a* is not receiving any routing information from sink node 202 and the routing information sent from non-sink node 204*b* is not more recent, the routing information that non-sink node 204*a* sends at a periodic interval will continue to be based on its stored routing information. This stored routing information is identical to routing information last received from sink node 202 before the link to sink node 202 failed. Therefore, this stored routing information still indicates sink node 202 as the neighbor with the fastest route and contains a race number 212*a* with the value of '1'.

It will be appreciated that because of the failure of the link between sink node 202 and non-sink node 204*a*, the fastest route from non-sink node 204*d* to sink node 202 is now through non-sink node 204*e*. It will be further appreciated that when non-sink node. 204*d* receives routing information from non-sink node 204*e* containing the race number with value '2', it will determine this received routing information to be more recent than stored routing information. Non-sink node 204*d* will then store this received routing information along With a neighbor node identifier to indicate that neighbor non-sink node 204*e* represents the fastest route to the sink node 202. As a result, non-sink node 204d has properly updated its stored route information to reflect the change in network topology caused by the failed link.

Figure 4B:
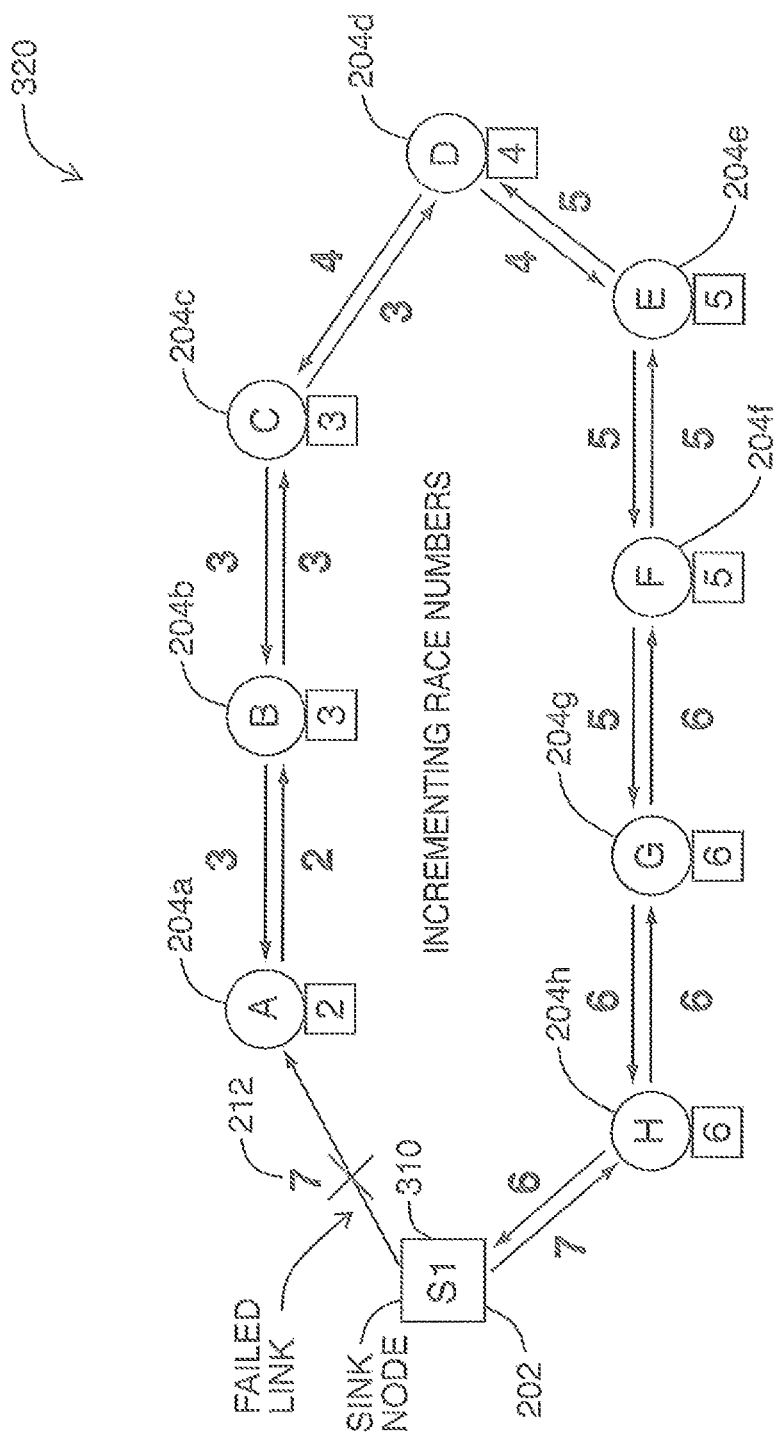
FIG. 4B is a schematic diagram illustrating the sequential flow of routing information containing race numbers from a sink node to a non-sink node in an example network topology wherein the neighboring node of a failed link has updated its route.

Reference is now made to FIG. 4B in which two more periodic intervals have passed and no other links have failed. Non-sink node 204a has received more recent routing information containing a race number with the value '2' from neighbor non-sink node 204b. It now stores routing information with this race number and indicates that neighbor node 204b represents the fastest node. Therefore, it has correctly updated its stored routing information in response to the failed link between the sink node 202 and non-sink node 204a. In the case of FIGS. 4A and 4B, if the failed link from sink node 202 to non-sink node 204a is reestablished after a few more periods, then the routing information from sink node 202 that is more recent will be received by non-sink node 204a. As a result, non-sink node 204a will store this routing information to reflect the reestablished path. As this routing information is propagated to other nodes of the network, these nodes will again update their stored routing information in response to the reestablished link.

In addition, as mentioned above, in various embodiments, the selection of a route comprises a dynamic process and accordingly the selected route may continually change in response to changes in route conditions. For example, if there are two routes and the first route usually is congested while the second route is less congested, the selected route may switch back and forth between the two routes as conditions, such as the congestion of the first route, change.

Congestion along a route may occur for example when many mobile nodes are located within the same range of each other such that each node has many neighbors. In order to throttle the data being transmitted among neighbor nodes, the nodes may be configured to reduce the amount of data it transmits when there is congestion. For example, due to congestion, a node may only send routing information every few periodic intervals rather than every periodic interval. It will be appreciated that this will affect how often more recent routing information is sent by that node. Furthermore, in some embodiments, where congestion reaches a certain threshold, a node may cease transmitting data entirely. It will be appreciated that this case produces the same practical effects as when a link has failed, in that neighbor nodes will not receive any routing information at all from that node.

When the first route is not congested, which may occur, for example, 10% of the time, routing information reach the node in question more quickly through the first route than through the second route. The other 90% of the time, as a result of the congestion of the first route, the second route more quickly provides routing information to the node in question. Consequently, the route selected by the node may continually switch back and forth between the two routes depending on conditions and the selected route may be the first route 10% of the time and the second route the remaining 90% of the time.

In a dynamically changing network, sink nodes must update the recency indicator in their routing information typically every period before the routing information is sent. In the case where the indicator of recency is a race number, the size of the race number will always be limited by number of bits allocated for representing the race number within a transmission of routing information. In a network comprising many sink nodes, the need to send routing information from each node containing many race numbers corresponding to each sink node can lead to the need to send a significant amount of data at each periodic interval. Accordingly, in various embodiments, only a set of race numbers of limited size is used, with the set being made as small as possible. When updates to routing information have used all the race numbers in the set, the first number of the set is used again. Therefore, race numbers are said to be cyclical. In some embodiments, this is achieved by having race number values that are selected from a subset of the integers.

In some embodiments, as illustrated in FIG. 5A, the set consists of an ordered series of race numbers with monotonically increasing values, where after reaching the greatest race number in the series, the sequence of race number cycles back to the least race number. However, it should be understood that the set of race numbers does not need to be a series of monotonically increasing numbers. For example, the routing protocol would operate in the same manner if the race numbers are monotonically decreasing or if the race numbers progress through a pre-determined sequence of numbers. The set of race numbers could comprise any unique elements as long as the nodes that receive the race numbers know the order of the race numbers in the series. It will be appreciated that the use of a limited set of race number values can significantly shorten the length of the transmitted data, and improve the efficiency of the method of the present invention. The length of transmitted data can be further shortened through the use of aggregated routing information, as discussed later. That is, routing information from multiple sinks can be sent as one aggregated routing message, allowing for the routing information to be compressed. In one embodiment, the routing information is compressed by omitting the sink node identifiers. Instead, the position of the race numbers in the aggregated routing message can be used to identify the sink node.

Referring to FIG. 5A, therein illustrated is a schematic diagram illustrating a series of 2-bit race numbers being sent from a sink node 102, over time, with a race number range of 0 to 3, more generally referred as 400. In one embodiment, the race numbers may be monotonically increasing such that the race numbers repeatedly iterate from 0 to 3. It will be understood that although an exemplary 2-bit race number is discussed, the bit length of the race number may be modified to be shorter or longer. For example, in some embodiments, it may be an advantage to have an indication of uninitialized values i.e. an indication that the race number value is unknown or undefined. The total number of possible race number values can be an odd number, and, as will be shown later, an odd number of possible race number values is as efficient as an even number of possible race number values. Since a binary representation results in an even number of possible values, restricting the number of possible race number values to an odd number leaves one available value in the binary representation, which can then be used to represent the uninitialized value. As such, for the 2-bit race number example, the range of race numbers would be in the range 0 to 2, instead of 0 to 3.

When the race numbers are cyclical, ambiguity may result when comparing two values of race numbers. For example, a race number appearing later in the series (e.g. a higher value number in the case of a monotonically increasing series) could either be a more recent race number or a less recent race number from a previous cycle. This ambiguity can cause a node to incorrectly assess that received routing information containing an earlier race number is more recent than stored routing information containing a later race number. Referring back to FIG. 5A, race numbers 412a, 412b, 412c have the values '0', '2', '0' respectively. A non-sink node that has stored routing information containing race number 412b with a value '0' will be unable to determine whether a race number having a value '2' contained in some received routing information is more recent (race number 412c) or less recent (race number 412a).

Figure 5B:
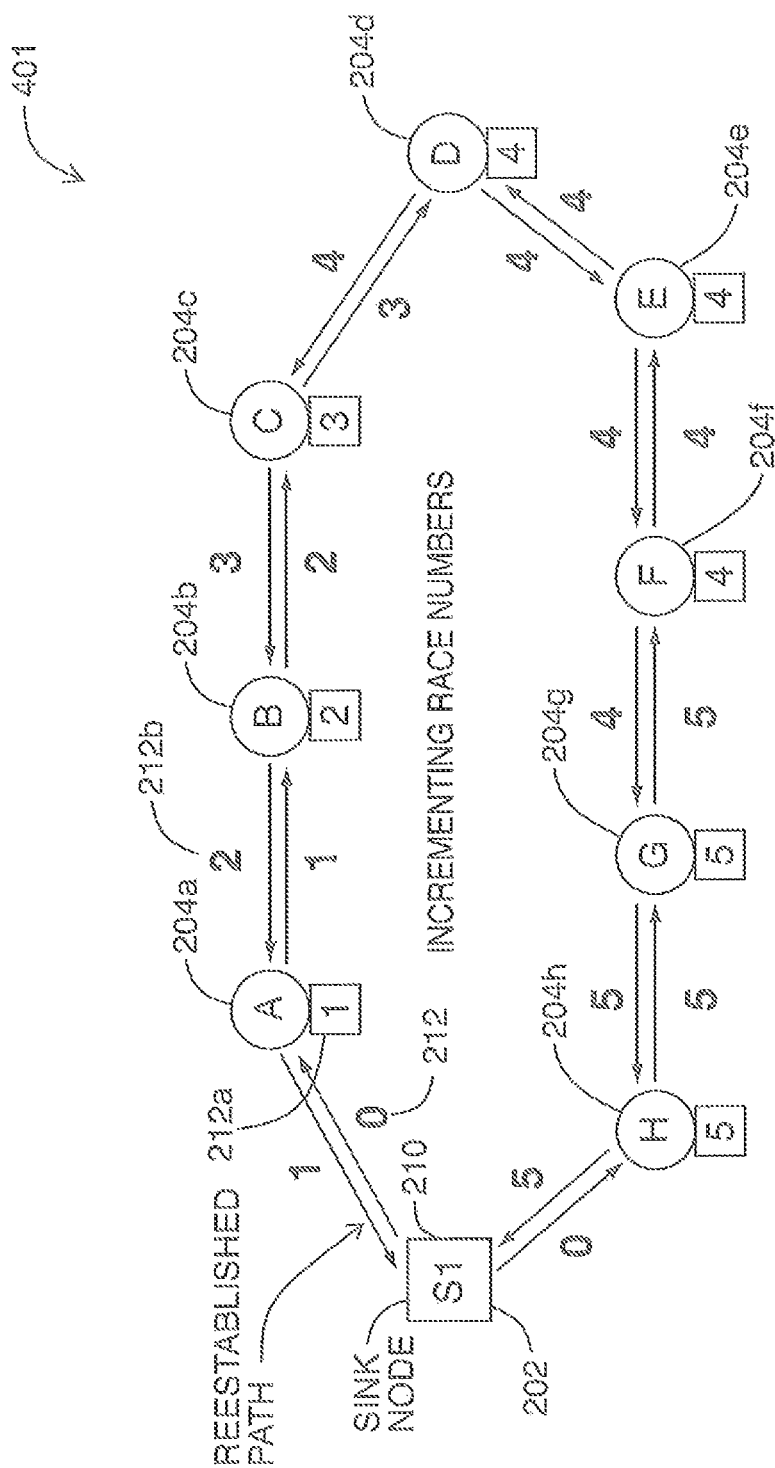
FIG. 5B is a schematic diagram illustrating the sequential flow of routing information containing race numbers from a sink node to non-sink nodes in an example network wherein one non-sink node is receiving routing information from its neighboring nodes that will cause an ambiguity in race numbers.

Referring now to FIG. 5B, which illustrates a network with the same topology as the networks of FIGS. 3A and 4A. The link between node 202 and non-sink node 204a has just been reestablished after having failed for a significant duration of tune. Before the link being reestablished, non-sink node 204a received routing information sent from non-sink node 204b. Since non-sink node 204a determined this routing information to be more recent, it stores' routing information from non-sink node 204b to indicate that non-sink node 204b is the neighbor node representing the shortest path to node 202. For example, it may receive routing information from non-sink node 204b with the race number 212a having the value '2', which it stores. However, after the link between node 202 and non-sink node 204a is reestablished, non-sink node 204a will receive routing information from sink node 202 containing a race number 212 with the value '0'. It will be appreciated that in order for the non-sink node 204a to correctly determine that this last received routing information is more recent, it must have some way of distinguishing cyclical race numbers. For example, in this case, due to race numbers being cyclical, a race number with a lesser value may still indicate that the routing information is more recent than other routing information containing a race number with a greater value.

Figure 5C:
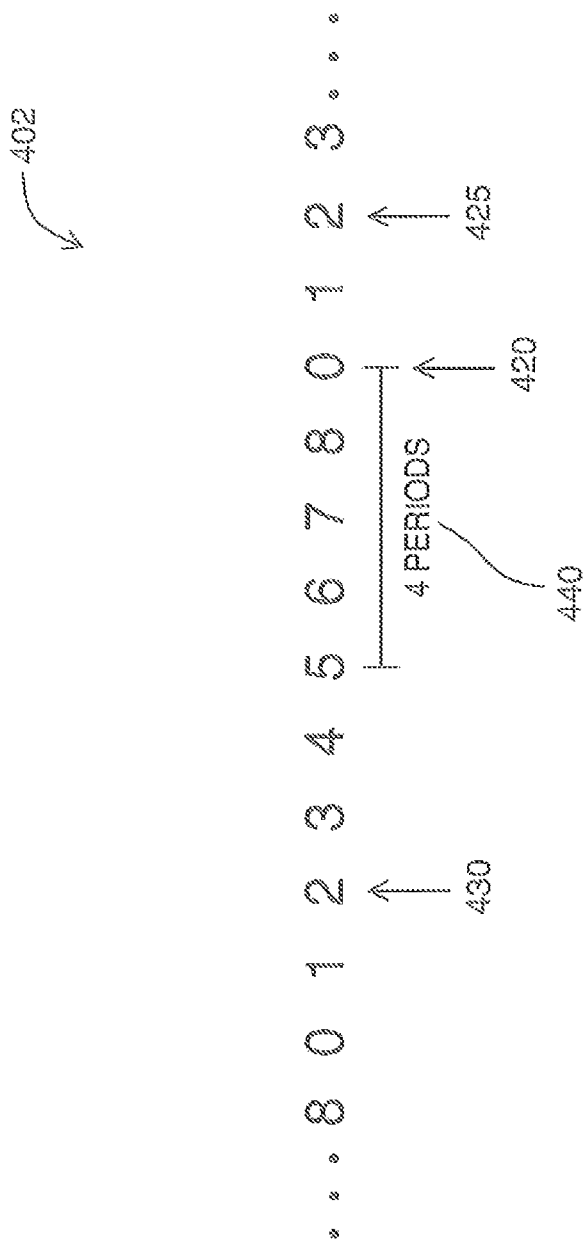
FIG. 5C is a schematic diagram illustrating the sequential flow of race numbers from the perspective of one example non-sink node, showing ambiguities in the race numbers contained in routing information it is receiving from neighboring nodes.

Reference is now made to FIG. 5C, more generally referred to as 402, which illustrates the series of race numbers used for FIG. 4B. The race number contained in the routing information received by non-sink node 204a from the sink node is indicated by reference indicia 420. By simply determining the greater race number value as the more recent, non-sink node 204a is effectively misinterpreting the race number in the routing information received from non-sink node 204b as being the race number indicated by reference indicia 425 in FIG. 4B. However, the actual race number contained in the routing information received from non-sink node 204b is indicated by reference indicia 430 and, as can be seen, is actually an older race number than that received from the sink node. This error in interpreting the race number contained in received routing information is herein referred to as an ambiguity in race numbers.

The ambiguity in race numbers illustrated above can be avoided by appropriately selecting the number of possible race number values based on the network topology. In general, given a particular network topology, if the set of race numbers is appropriately large, then the ambiguity can be avoided. The actual minimum size varies depending on the network topology. To ensure that ambiguities are avoided, the size of the set of race number values is selected such that when received routing information is compared with stored routing information, the maximum allowable numerical distance in the series of race numbers between the two race numbers of the compared routing information, does not exceed $$L = \frac{N-1}{2} \qquad 78.1$$

assuming N is an odd number, and where N is the size of the set of race number values. If this condition is met, this will allow the most recent of the two race numbers thus compared to be determined.

For the example network 401 in FIG. 5B, the worst case occurs when the link between the sink node and a neighbor non-sink node fails. Non-sink node 204a is directly connected with a link to sink node 202. When this link fails, non-sink node 204a will only receive routing information from neighbor node 204b. The propagation of routing information through the network will allow non-sink node 204a to receive more recent routing information from node 204b after some time. This will effectively update the stored routing information of node 204a to reflect the change in network topology caused by the failed link. If at any time afterwards, the failed link between non-sink node 204a and sink node 202 is re-established, node 204a will again receive routing information from both sink node 202 and non-sink node 204b. However, the routing information it receives from sink node 202 will be more recent than the routing information it receives from 204b since the latter has traveled over a much longer route and therefore was originally sent by sink node 202 several periods ago.

It will be appreciated that there may be a large difference between the values of the two race numbers contained in routing information received by node 204a from sink node 202 and in routing information sent from non-sink node 204b. It will be further appreciated that the potential difference between the values is largest at node 204a, or node 204h because they are connected to the sink node over the longest possible route between any non-sink node and the sink node in the network.

The difference in the race numbers contained in routing information received by non-sink 204a from its two neighbors gives rise to a potential miscalculation of the route to the sink for the two nodes. Indeed, this ambiguity can exist at any node where the values of the received race numbers are ambiguous, as described in paragraphs [0070]-[0072], but for the topology given in FIG. 5B, comparison of routing information received by node 204a from its two neighbors represents a worst-case. A similar worst-case exists for node 204h. In general, for any given network topology, if the set of race numbers is appropriately large, this ambiguity can be avoided.

In most network topologies, a topology similar to the one shown in FIG. 5B, used previously in discussing ambiguities in race numbers, can be had as the longest chordless cycle of the topology. In analyzing the worst case for which ambiguities most readily arise, the longest chordless cycle is of interest because it is along the nodes in the longest chordless cycle that race numbers will potentially propagate over the largest number of links because any alternative route connecting the nodes which form the longest chordless cycle, will per definition have longer path lengths. It is thus the longest chordless cycle in the topology that shows the potential of ambiguities when comparing race numbers, and the worst case is exhibited when a link between a sink and its neighbor fails for some time before being reestablished, as exemplified previously with the ring topology. Note that the sink node does not necessarily have to be a node in the longest chordless cycle, for the described worst case scenario, but at least one node, part of the longest chordless cycle, has to provide the shortest route to the sink node of this analysis. In the following it is assumed that the sink node is part of the longest chordless cycle, for ease of description.

In the case where the longest chordless cycle comprises h nodes (including the sink node), the largest potential difference in race number values contained in routing information received from neighbor nodes will occur, as stated above, at a non-sink node that is directly connected to the sink node. Referring again to FIG. 5B the sink node is node 202. The non-sink node 204h has the sink node 202 as a first neighbor node. It also has a second neighbor node, which is a non-sink node connecting the first non-sink node to the sink node over the longest possible route. In the example network of FIG. 5B, the second neighbor node is node 204g. This second neighbor node is connected to the sink node over a route comprising h−2 links. Along this route, the time for a race number to propagate through the nodes will on the average be $t_{prop}$ defined as:

$$t_{prop} = t_{tr}(h-2) = \left(\frac{1}{2}h - 1\right)p \qquad 83.1$$

as per the definition of travel time of equation 52.1 taking into account an average node wait time $$\frac{1}{2}p$$

at each node. Since the sink node updates routing information at every periodic interval p, it will have carried out $$\frac{1}{2}h - 1$$

updates in that time.

Figure 6A:
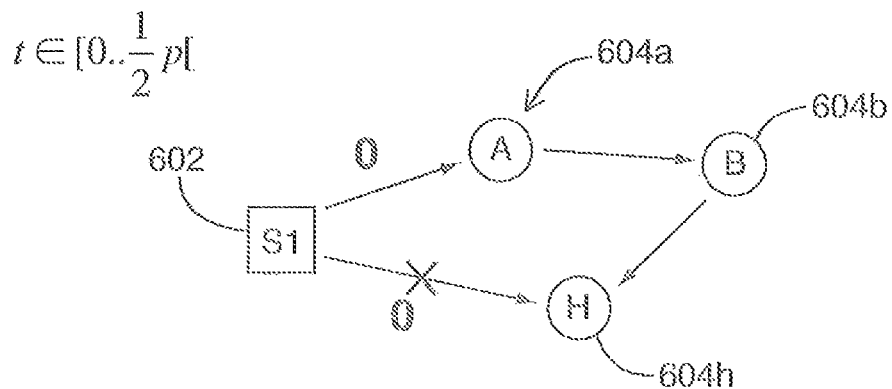
FIG. 6A is a schematic diagram illustrating the propagation of race numbers contained in routing information over a network comprising 4 nodes.
Figure 6A:
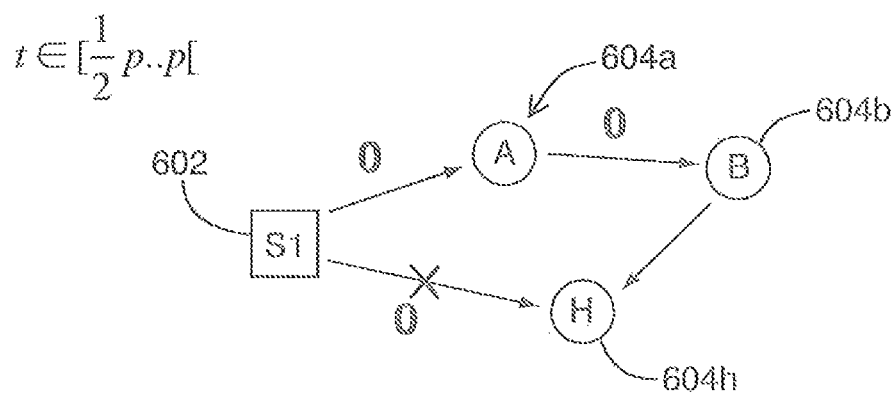
Figure 6A:
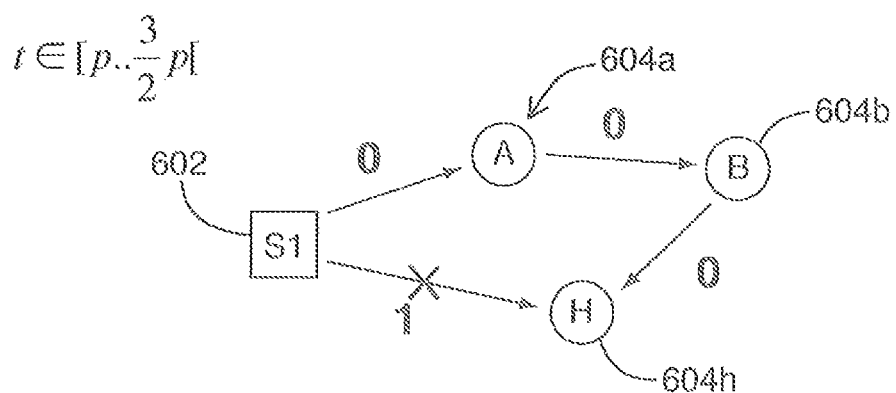
Figure 6B:
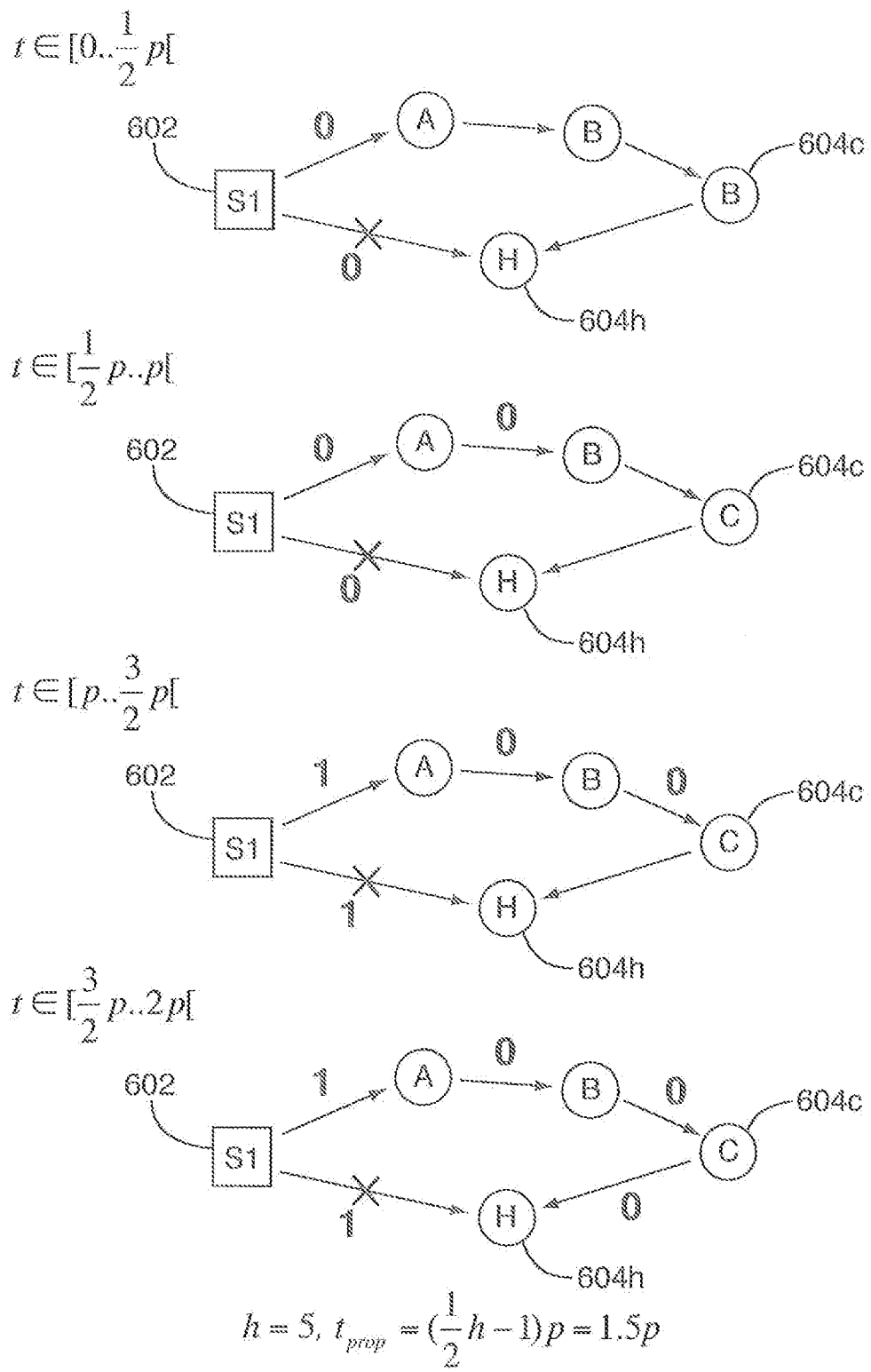
FIG. 6B is a schematic diagram illustrating the propagation of race numbers contained in routing information over a network comprising 5 nodes.

Reference is now made to FIGS. 6A and 6B simultaneously, illustrating two networks with ring topologies composed of 4 and 5 nodes respectively. These represent examples of networks having an even and an odd number of nodes, respectively. In both examples, an update of the race number at the sink node 602 to the value '0' is considered to occur at time t=0. The beginning of the period for sink node 602 is defined to start at an infinitesimal time after time t=0, at which time sink node 602 will transmit the routing information to node 604a. At t=0, the link directly connecting sink node 602 with node 604h is in a failed state.

Referring now to FIG. 6A only, illustrating a network where h=4. In this network, node 604h's second neighbor node is node 604b. The propagation time of routing information sent from sink node 602 to node 604h over the longest path containing node 604b is calculated using equation 83.1:

$$t_{prop} = \left(\frac{1}{2}4 - 1\right)p = 1p$$

Within this time interval 1p, sink node 602 will have undertaken 1 update of its race number. If the link directly connecting node 604h to sink node 602 is re-established at sometime within the interval t∈[0 . . . p[, then node 604h will receive routing information containing race number '1' from node 602 and routing information containing race number '0' from node 604b in the interval t∈[p . . . 1.5p[. Since 1 update occurred at sink node 602 within this interval, the result is a difference of 1 in the race number updates at the time node 604h compares race numbers from node 604b and from sink node 602.

Referring now to FIG. 6B only, therein illustrated is a network where h=5. In this network, node 604h's second neighbor node is node 604c. The propagation time of routing information sent from sink node 602 to node 604h over the longest path containing node 604c is calculated using equation 83.1:

$$t_{prop} = \left(\frac{1}{2}5 - 1\right)p = 1.5p$$

Within this interval, sink node 602 will have undertaken 1.5 update of its race number. If the link directly connecting node 604h to sink node 602 is reestablished at some time within the interval t∈[0 . . . 1.5p[, then node 604h may receive routing information containing race number '1' from sink node 602 and routing information containing race number '0' from node 604c in the interval t∈[1.5p . . . 2p[. However, since equation 52.1 is based on the assumption that the start times of the periods of the nodes are random, the result of 1.5 updates from equation 83.1, with h=5, gives an equal probability that either 1 or 2 updates of the race number may occur at the sink node within this same time interval. Accordingly, the difference may be of 1 or of 2 race number updates when node 604h compares race numbers received from node 604c and from sink node 602.

Applying equation 83.1 to the topology of FIG. 5B where h=9, the result is that the sink completes $$t_{prop} = \left(\frac{1}{2}9 - 1\right)p = 3.5p$$

updates in the time it takes routing information containing a specific race number to travel over the longest path from sink node 202 to non-sink node 204h. There is therefore an equal probability that either 3 or 4 updates of the race number may occur at the sink node within this time interval. Since the exact number of updates to occur within the time interval, a boundary condition exists when h is odd.

To avoid this boundary condition, for further analysis, the number of links h used in the topologies for these examples is assumed to be even. Therefore, for any $t_{prop}$ of equation 83.1, the number of updates of the race number at a sink node will always be a natural number given by $$\frac{1}{2}h - 1.$$

Furthermore, the numerical distance between the values of race numbers contained in routing information received by the first non-sink node from its two neighbor nodes is also $$\frac{1}{2}h - 1.$$

Referring to equation 78.1, the maximum allowable numerical distance between two race numbers cannot exceed the constraint of this equation in order for the result of the comparison of the two race numbers to be unambiguous. Therefore, in order to ensure that there may not be any potential for ambiguity in the race numbers contained in routing information received from the neighbor node, L must satisfy the inequality:

$$L \geq \frac{1}{2}h - 1 \qquad 88.1$$

when taking into account average node wait times of $$\frac{1}{2}p.$$

When the size of the set of race numbers is appropriately selected as discussed above and is updated by incrementing by one, and wrapping around to '0' after 'N−1', then the following algorithmic steps can be used to determine which race number is the most recent. The following example assumes two race numbers A and B (where A is the currently received race number and B is the stored race number), a maximum distinguishable distance in a sequence of numbers, L, as defined by equations 78.1 and 88.1 and race numbers belonging to [0 . . . N−1], where N is an odd natural number.

To determine which of two race numbers is more recent in a set of race numbers comprising a repeating sequence starting from '0' and incrementing to 'N−1', the following steps may be carried out:
1. X=A−B;
2. If (A<B), then X=X+N;
3. If (X>L), then race number B is more recent, else race number A is more recent or race numbers A and B are equally recent.

In various embodiments of the present invention, a race number pertaining to a given sink node is repeated at least once by the sink node. That is, its value is not changed during one or more subsequent periods of the sink node. Repeating the race number may reduce the likelihood of an ambiguity when comparing the race numbers of routing information propagating through the network.

Figure 7:
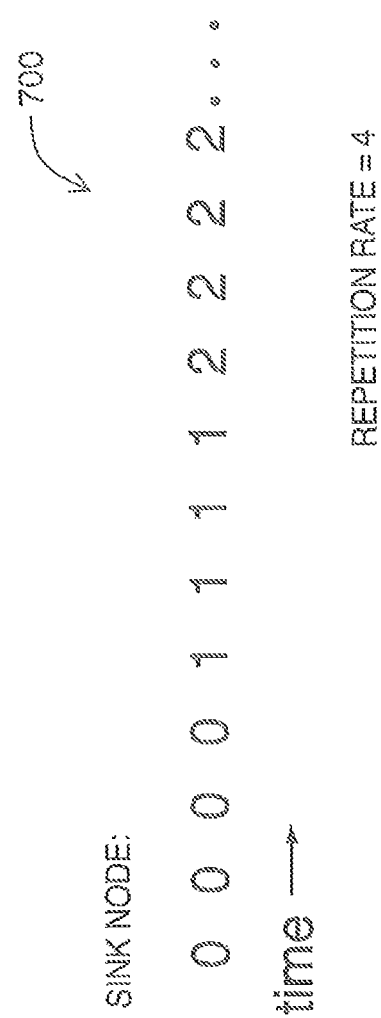
FIG. 7 is a schematic diagram illustrating the repetition of race numbers from the perspective of one sink node in an exemplary embodiment.

Referring to FIG. 7, therein illustrated is a stream of race numbers shown generally as 700. The race numbers shown in 700 are incremented by the corresponding sink node only after r number of periods. Since a node only updates its stored routing information with the newly received routing information if that routing information is more recent, the repeating of race numbers causes nodes to update their stored routing information for the corresponding sink less often.

As earlier discussed, the possibility of ambiguities when comparing race numbers propagating through the network can be reduced with the use of an appropriately-sized set of race numbers. Furthermore, in some embodiments, the repetition of a race number and the selection of a suitable size for the set of race numbers may together be used to prevent ambiguities in determining the recency of routing information. The repetition rate of race numbers, represented by 'r', is inversely related to the maximum distinguishable numerical distance in a sequence of numbers, represented by 'L'. Particularly, L and r should be selected such that:

$$rL \geq \frac{1}{2}h - 1 \qquad 93.1$$

where h is the length of the longest chordless cycle in the network topology.

Accordingly, the two factors, the repetition rate and the size of the set of race numbers, can be configured to depend on what is preferable in the network: faster updates or smaller numeric range of the race numbers. On the one hand, faster updates allow nodes to update their stored routing information more frequently in response to changes in the network. On the other hand, a smaller numeric range of the routing numbers will reduce the size of the routing information, resulting in lower radio usage and lower power consumption. It will be understood that all combinations of these two factors are within the contemplation of the subject embodiment.

Figure 8:
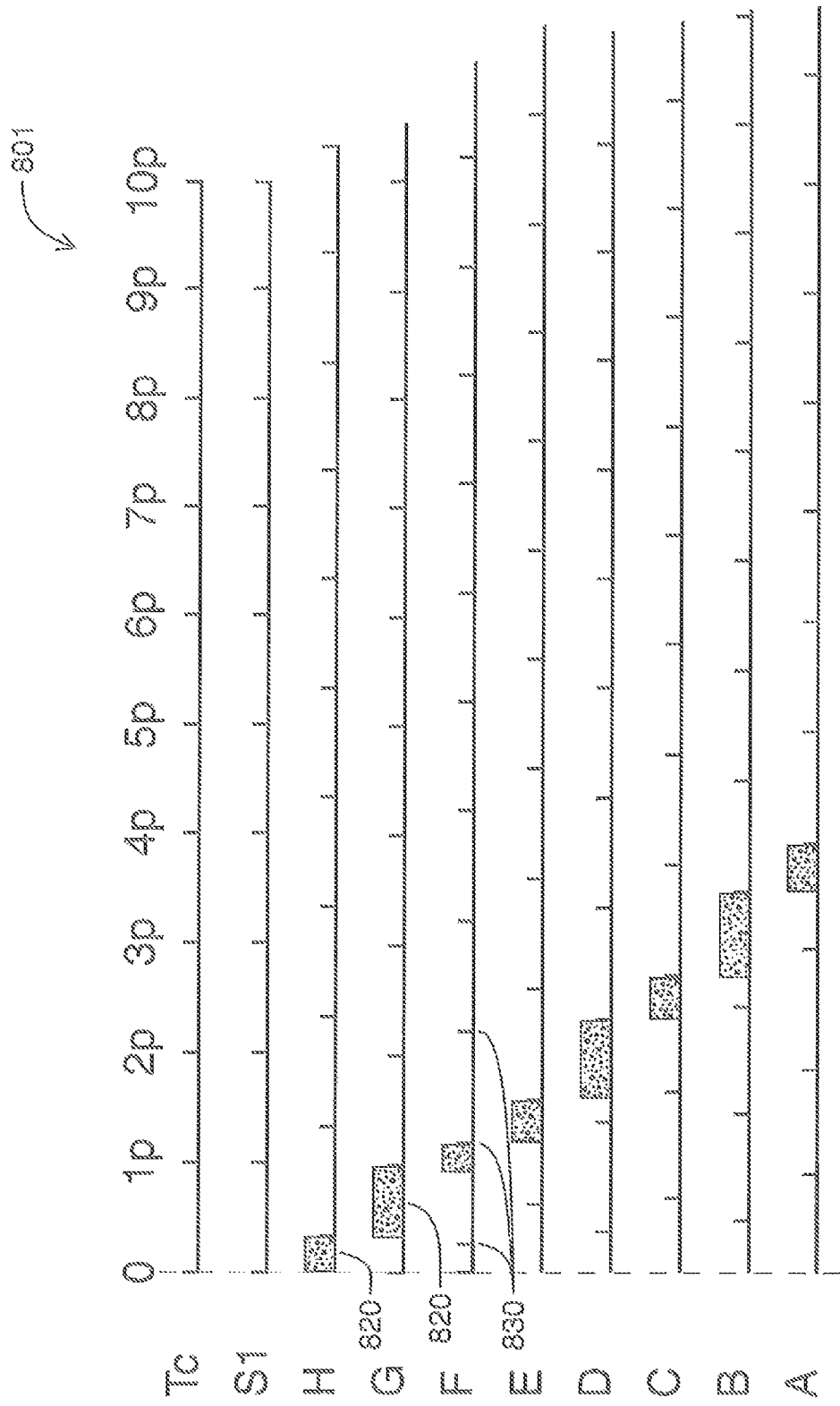
FIG. 8 is a schematic diagram of the timing and flow of routing information through a network topology in which the nodes are not synchronized.

Referring now to FIG. 8, therein illustrated is an example of the node wait times caused by the fact that the start times of the nodes are not synchronized, as previously discussed. Recall that because the start time of the periods are chosen at random, each non-sink node receiving routing information will wait an average of $$\frac{1}{2}p$$

before sending its routing information. FIG. 8 illustrates an example timing of routing information sent over a network of 9 nodes, where the periodic interval is chosen to be much greater than the duration of time from the time a node starts sending routing information to the time routing information is fully received at a neighbor node. It will be appreciated that by picking a long duration for the periodic interval, the duration of the transmission becomes small in comparison to the period, allowing for the approximation that the data is available at the receiver at the very beginning of the periodic interval for the transmitter.

The dotted rectangles represent the node wait times 820 at each node. The hashes denote the periodic intervals 830 at which nodes send routing information. It will be appreciated that each hash, denoting the arrival of periodic intervals, is not lined up in time with the hashes of other nodes to show that the time of transmission is not synchronized between nodes. Furthermore, it will be noted that dotted rectangles at each node are differently sized to show that the wait time at each node is typically different.

As discussed, the duration of the maximum node wait time approximates p. As stated, the maximum node wait time is experienced when a node receives routing information immediately after sending routing information of its own. Further, as discussed, the largest difference between two race numbers being compared e.g. after a failed link gets restored, or after a change of network topology, will occur at a node in the path of the longest chordless cycle of the network. This maximum difference may occur when the first node receives routing information from the sink node in the path of the longest chordless cycle (or from any other node in the path of the longest chordless cycle providing the best route to a sink), and from its second neighbor node over a path comprising h−2 links after the link between the sink node and the first node is reestablished after having failed for some time, or after a topology change forms an equivalent longest chordless cycle in the network.

If the maximum node wait time occurs at each node along a route, then the travel time along a route comprising h−2 links will approximate (h−2)p. Furthermore; within this time, a sink node will have updated the routing information it sends h−2 times. Therefore, the numerical distance between two race numbers being compared at a node connected to a sink node may approximate h−2. It will be appreciated that h−2 is much greater than $$\frac{1}{2}h - 1,$$

the numerical distance between two race numbers being compared at node after a time $t_{prop}$ calculated according to equation 83.1 when taking into account an average node wait time of $$\frac{1}{2}p$$

for each node. While it is highly unlikely that each node along a route will have a node wait time with a duration of p, some nodes may still have a node wait time that is longer than the average node wait time $$\frac{1}{2}p.$$

Where several nodes along a route consisting of n links have node wait times that are all longer or shorter than the average, the travel time over this route may become longer or shorter than the average travel time of $t_{tr}$ of equation 52.1 Therefore, even if the constraint set out in equation 93.1 is met, the results of comparing two race numbers may still be ambiguous.

Therefore, in some embodiments the factors r and L are chosen according to the equation $$rL \geq c\left(\frac{1}{2}h - 1\right) \qquad 99.1$$

where c is a factor to compensate for the situation where the travel time over a worst case path as described is longer than the average by a certain amount with a certain probability.

By treating whether the node wait time at a particular node will be greater or less than the average as a single stochastic event, it is possible to determine the probability of a number of nodes along of the route having node wait times deviating in the same direction away from the average node wait time of $$\frac{1}{2}p$$

along this route by using cumulative binominal probabilities. That is, it is possible to calculate the probability that a certain number m nodes all have node wait times greater than $$\frac{1}{2}p$$

or less than $$\frac{1}{2}p.$$

When the node wait time is less than $$\frac{1}{2}p,$$

it will fall in a range between 0 and $$\frac{1}{2}p,$$

with the average being $$\frac{1}{4}p.$$

When the node wait time is greater than $$\frac{1}{2}p,$$

it will fall in a range between $$\frac{1}{2}p$$

and $p$, with the average being $$\frac{3}{4}p.$$

If m nodes over a route deviate in the same direction away from the average node wait time, then the path will on average either be lengthened by $$\frac{m}{4}p$$

or shortened by $$\frac{m}{4}p.$$

It win be appreciated that, for every 4 nodes that deviate in the same direction, the travel time over a route will be lengthened or shortened by p time on average. FIG. 9 illustrates a table of the results from calculations based on the binominal distribution. The table shows the probability of 1 or more to 6 or more (917) nodes deviating in the same direction away from the average node wait time over routes with lengths ranging from 12 to 30 nodes.

As shown in FIG. 9, for a route having a length of 30 nodes, there is a probability of 0.1002 (919) that 4 nodes or more will deviate from the average node wait time in the same direction. Similarly, in view of a relatively similar probability of 0.1052 (921) for a route with a length of 16 nodes, 3 nodes or more would deviate in the same direction away from the average node wait time.

By using cumulative binominal probabilities, as provided in FIG. 9, the probability of such deviations can be determined. The factor c of equation 99.1 illustrates a factor by which to compensate for these possible variations in travel time along a route, to make the possibility of ambiguities in comparing two race numbers small enough in a given practical application.

Typically, rL, and c are parameters used in the design phase of a given implementation of the present invention, and can possibly be difficult to change in a finished product. In this case, knowing rL and c will allow for making a prediction as to how well a given implementation will cope with worst case scenarios. The design choice of rL and c is thus based on satisfying the inequality of 99.1. The larger the value of c is chosen to be, the less likely are the variations in travel time to influence the worst case scenario. By making a choice of rL and c in the design phase, a limit is imposed on the size of the longest chordless cycle in a given network topology for which an optimal route between a given node and a sink node, or sink nodes, is guaranteed to be found. Note that if the inequality of 99.1 is not satisfied, sub-optimal routes may sometimes be selected for some nodes in the network, although a route is always found.

In one embodiment, the repetition of race numbers may allow the set of race numbers to be represented by one bit, representing, for example, the values '0' and '1'. In contrast to a set of race numbers that is large in size, it is in this embodiment no longer possible to directly compare two race numbers to determine which race number is more recent. Instead the recency of any routing information is determined by observing the race numbers received over time. For example, if a node has been receiving the same race number for sufficiently long time from all its neighbors, and then receives a change in race number in the received routing information from one of its neighbors, it will know that the optimal route to the sink is through said neighbor.

Figure 10:
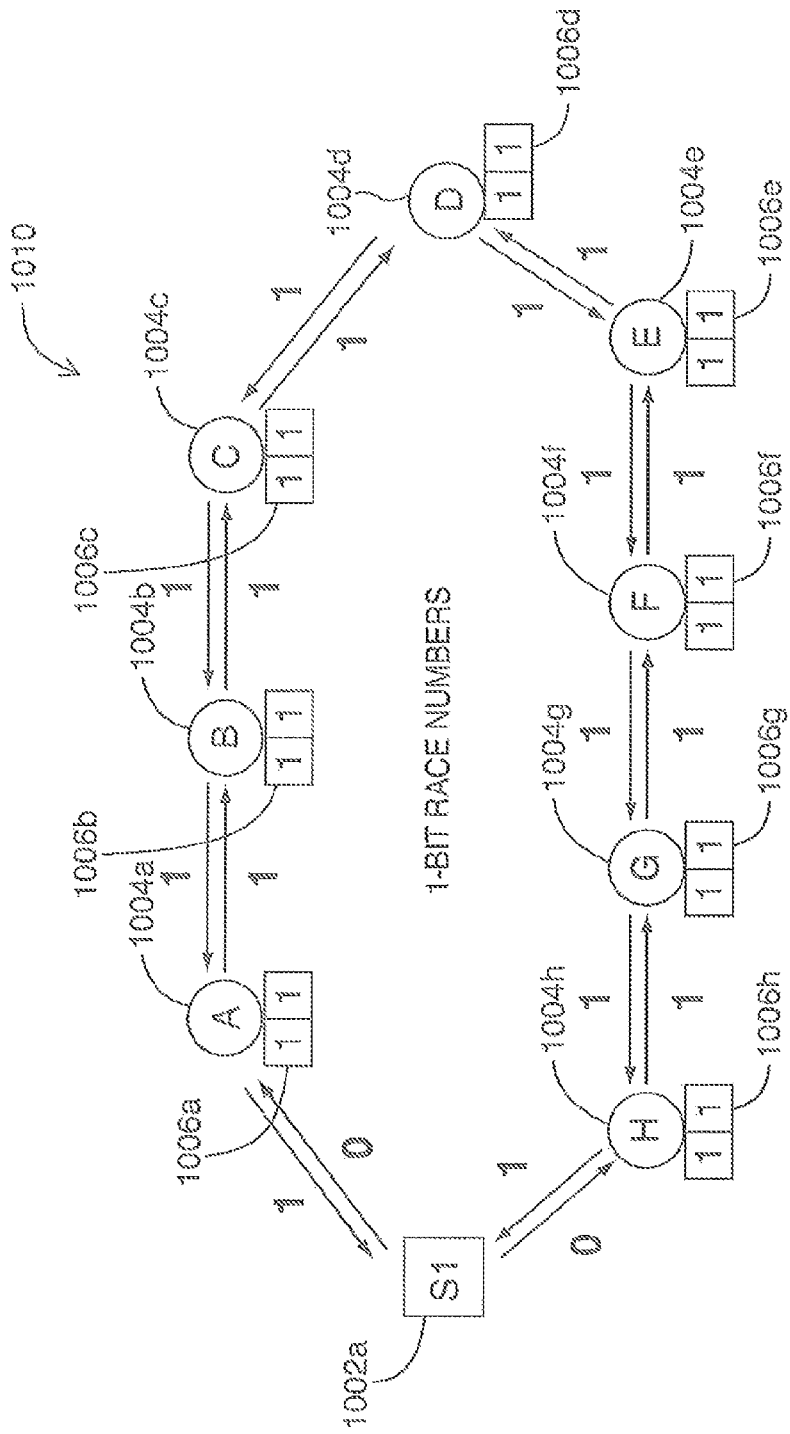
FIG. 10 is a schematic diagram illustrating the repetition of race numbers in an embodiment with 1-bit race numbers in an example network topology.

Referring to FIG. 10, therein illustrated is an example embodiment of the operation of the subject routing protocol with the use of 1-bit race numbers when the network topology is similar to that which is shown in FIG. 3A, shown generally as 1010. To address the fact that it is no longer possible to determine which race number comes after another race number in the sequence by simply comparing the two numbers, the number of times a number is repeated must be chosen appropriately.

In this embodiment, a node now waits for all neighbors to send the same race number before accepting the first neighbor to send a changed race number as the neighbor having the optimal route to the given sink. Instead of storing the race number of the most recent routing information in the routing table, each node must now keep track of the race number contained in the last routing information received from each neighbor node. In order to meet the condition that a node receives routing information containing the same race numbers from all of its neighbor nodes, the number of times r, a race number is repeated in successive updates of routing information at each sink node must be sufficiently large. This will guarantee that each node of the network will be able to find the optimal route. To meet this condition, the number of repetitions must be sufficiently large such that all the nodes in the longest chordless cycle of a given topology receives the same race number before the race number is changed in an update at a given sink node. This condition is given by the inequality 99.1 where for this 1-bit case, L=1.

Referring back to FIG. 10, an example network is shown in which 1-bit race numbers are used to determine the fastest route to a sink. Stored race numbers 1006a, 1006b, 1006c, 1006d, 1006e, 1006f, 1006g, and 1006h represent the last race numbers received by nodes 1004a, 1004b, 1004c, 1004d, 1004e, 1004f, 1004g, and 1004h respectively from each of their neighbor nodes. Since each node only has two neighbor nodes, two received race numbers are stored at each node. In this example, node 1004a has stored race numbers 1006a with the values '1' and '1' to represent that the last race numbers it received from its two neighbors nodes, sink node 1002a and node 1004b respectively, had the value '1'. Since node 1004a has received the same race number from all of its neighbor nodes, it will determine the first neighbor node to transmit a change in race number to be the neighbor node representing the optimal route to a given sink node. In FIG. 10, sink node has changed the value of the race number to '0' and is sending routing information to node 1004a containing this race number to nodes 1004a and 1004h. When node 1004a receives this routing information, it will determined that there is a change in race number and will therefore determine that sink node 1002 represents the optimal route. It will be appreciated that since each of the other nodes of the network also have stored race numbers '1' and '1', when routing information containing race number with the value '0' is received by these other nodes, each of these nodes will determine that it has received a change in race number and will consequently update its optimal route to sink node 1002.

It will be understood by those skilled in the art that the tracking at a node of the last race number received from each of the neighbor nodes may be implemented in a plurality of ways known in the art.

As there may be more than one sink node 102 (in a network 100, each sink node 102 may send out its own routing information on a periodic basis. As such, a node may receive routing information from numerous sink nodes 102 or non-sink nodes 204 within one period. In one embodiment, a node may send aggregated routing information comprising routing information for more than one sink node of the network.

To reduce the size of the aggregated routing information sent, sink node identifiers could be omitted from the aggregated routing information. Instead, sink node identity can be inferred from the placement of each indicator of recency corresponding to each sink node within the aggregated routing information. For example, each sink node may be assigned a position in the sent aggregated routing information so that a non-sink node 204 may determine the identity of sink node 102 from the position in which the indicator of recency corresponding to sink node is placed within the received aggregated routing information.

Figure 11A:
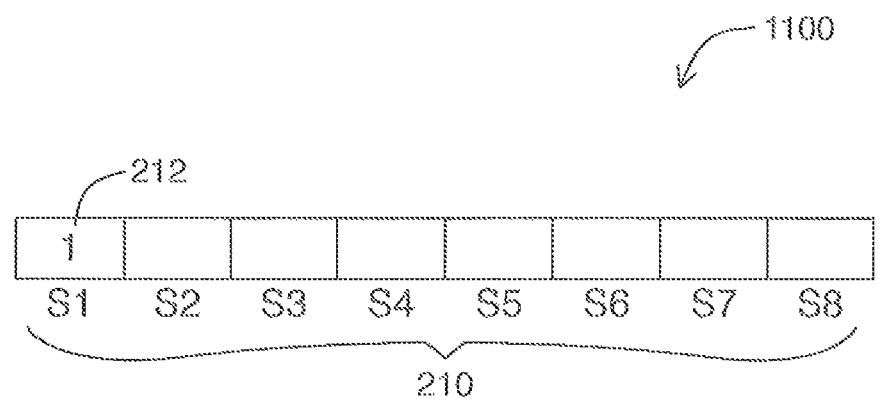
FIG. 11A is a schematic diagram showing example aggregated routing information for transmission.

Referring to FIG. 11A, therein illustrated is an example of aggregated routing information that a node may periodically send out, referred to generally as 1100. Such aggregated routing information may contain routing information for sink nodes 202 with sink node identifiers. However in other embodiments, aggregated routing information may be structured such that sink nodes 202 may be identified without the inclusion of sink node identifiers. For example, in FIG. 11A, aggregated routing information contains positions 'S1' through 'S8'. Each position corresponds to a sink node of the network. It will be appreciated that in this example, up to eight sink nodes may be found in the network. The indicator of recency corresponding to each sink node is placed at the appropriate position within the aggregated routing information. For example, routing information containing the race number 212 with value '1' for sink node 202 (with sink node ID 'S1') may be placed at position 'S1' and included in the aggregated routing information sent from a non-sink node. As compared to a situation where routing information from each sink node 102 is sent separately, aggregating routing information in this manner can eliminate a significant amount of overhead, and may therefore be a desirable optimization.

It will be appreciated that the routing information stored at a non-sink node may have a similar configuration where sink nodes are identified by positions 'S1' through 'S8' and the indicator of recency corresponding to each sink node is stored at the appropriate position. In addition, a node ID (not shown) is included to identify the neighbor node representing the fastest route to the sink node identified by that position.

In another embodiment, the entirety of the aggregated routing information stored at a node is not sent all at once in a single periodic interval. Instead, sink nodes are separated into groups of one or more sink nodes such that only the routing information for one group of sink nodes is sent per period by the node. The aggregated routing information comprising the routing information of all sink nodes of a group sink nodes is herein referred to as a "page". The node cycles through the groups of sink nodes, sending the page for each group at a periodic interval, Referring to FIG. 11B, therein illustrated is a schematic diagram of a further embodiment containing a network topology wherein sink nodes are grouped or "paged", shown generally as 1110. It should be understood that FIG. 11B is a schematic diagram and does not necessarily illustrate relative physical positioning of elements, i.e. in various embodiments, sink node grouping, for example as shown in FIG. 11B, reflects a logical grouping, and may or may not be related to any physical placement of the sink nodes.

Figure 11B:
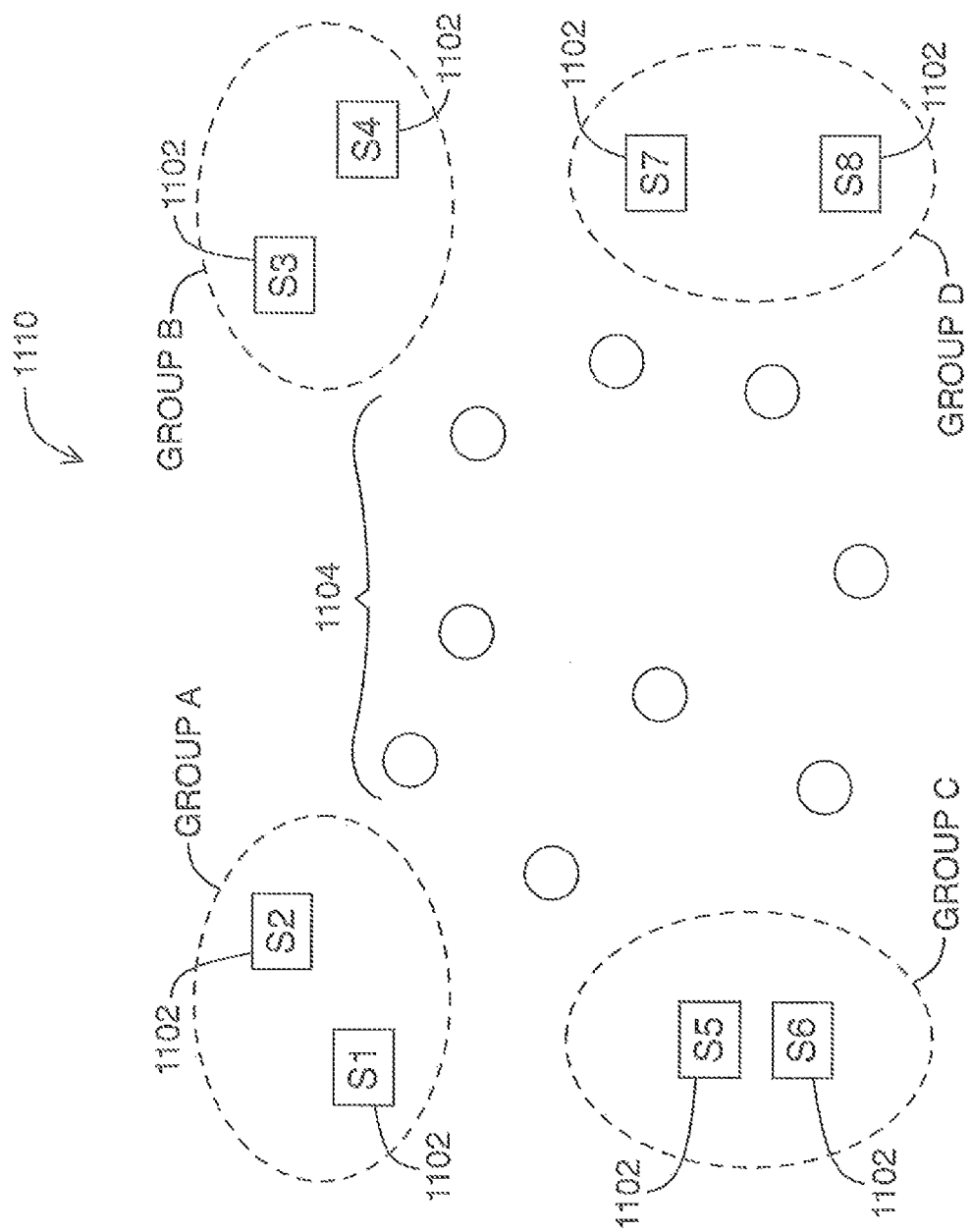
FIG. 11B illustrates a schematic diagram of a network topology where sink nodes are grouped.

Continuing with FIG. 11B, therein illustrated is an exemplary network where there are 8 sink nodes 1102 labeled 'S1' to 'S8'. The sink nodes 1102 may be divided into 4 groups of 2 nodes each, groups 'A' through 'D', for example. It will be understood that the number of sinks is for example purposes and any suitable number of sink nodes, non-sink nodes or network topology may be employed to practice the described embodiment. Particularly, it will also be understood that nodes may be mobile and that network topologies may change frequently.

Figure 11C:
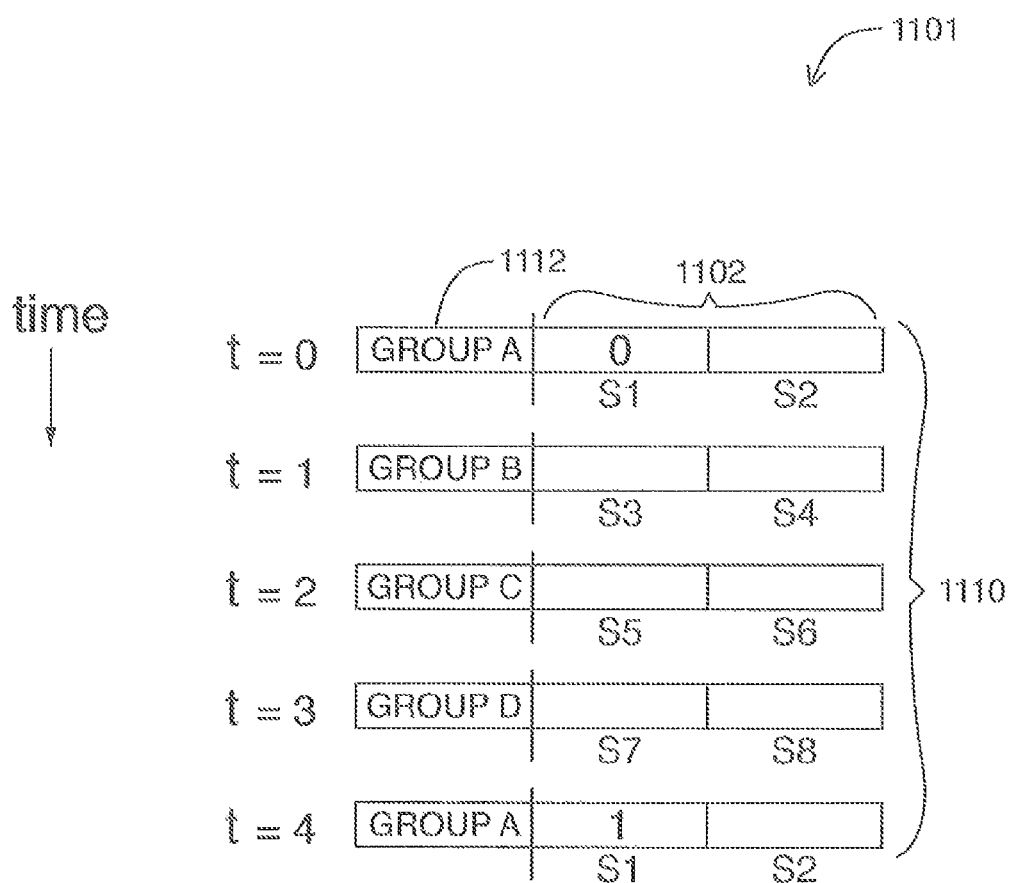
FIG. 11C illustrates sequentially grouped route messages.

Referring to FIG. 11C, therein illustrated is an example of pages of routing information being sent over time in the example embodiment where sink nodes 1102 are grouped. The routing information, shown generally as 1101, corresponding to the group of sink nodes named Group A in this example is shown to be sent in Page 0 and routing information corresponding to Group B is shown to be sent in Page 1, etc. In comparison to the aggregated routing information illustrated in FIG. 11A, FIG. 11C illustrates routing information for sink nodes in groups 'A' through 'D' being attended to sequentially through successive transmission of aggregated routing information 1110 in 5 consecutive periodic intervals (t=0 to t=4). Particularly, sink nodes labeled 'S1' and 'S2' are being attended to in the first periodic interval (t=0), sink nodes labeled 'S3' and 'S4' in the second periodic interval (t=1), sink nodes labeled 'S5' and 'S6' in the third periodic interval (t=2) and sink nodes labeled 'S7' and 'S8' in the fourth periodic interval (t=3). After cycling through all available sink nodes, sink nodes labeled 'S1' and 'S2' are attended to again in the fifth periodic interval (t=4). It will be understood that sink node groups may not need to be addressed in numerical sequence, and may be reordered according to a predetermined order.

To identify the sink nodes in each group, each transmission of shortened aggregated routing information 1110 may also contain a field 1112 for identifying the group of sink nodes that are being attended to. Such group address field 1112 may be configured to be of a bit-length that is no larger than is necessary to properly identify each group present in the network. For example, for the 4 groups 'A' through 'D' in the example network topology, the group address field may be 2-bits so as to allow for the unique identification of the 4 groups.

Since sink nodes also act as routing nodes and store routing information indicating the fastest route to other sink nodes of the network, sink nodes also cycle through the groups of nodes, sending a page for each group at a periodic interval. When the page to be sent from a given sink node contains routing information corresponding to that sink node, the sink node updates its own indicator of recency in that page to indicate that the routing information is more recent. For routing information corresponding to all other sink nodes, the sink node sends routing information based on its stored routing information.

When received at a node, the contents of a page of aggregated routing information 1110 may be directly mapped to the specific sink nodes 1102 through the location within the page, 1110. As with the full-length transmission of aggregated routing information discussed in relation to FIG. 11A, the mapping of routing information to a sink node within a page may be done based on the position of the routing information within the page, so as to avoid the need for the explicit addressing of sink nodes 1102.

The placement of sink nodes into groups, as shown in FIG. 11B, allows the page to be a fraction of the size of the full-length transmission of aggregated routing information. Even though each page 1110 may need to contain an additional group address field 1112, the overall length of each transmission may still be shorter. This may have the effect of reducing the bandwidth requirement and radio usage of each node, thereby leading to reduced power consumption by each node. Notwithstanding the benefits of aggregating routing information, the grouping of sink nodes causes routes to be updated less frequently. In a configuration where sink nodes have been grouped into k groups, a node receiving aggregated routing information from a neighboring node for a first group of nodes will have to wait until the neighbor nodes cycles through all the other groups before again receiving more recent routing information for that particular group of sink nodes. The node will therefore have to wait k periods between receptions of routing information for a group of sink nodes from a particular neighbor node. Similarly, the rate of route updates has been decreased by a factor k.

Referring back to FIG. 11C, a neighboring node will receive routing information for sink nodes of Group A at time 0 but must wait four periodic intervals before again receiving more recent routing information for sink nodes of Group A at time t=4. When a node receives routing information for a certain group of sink nodes, it must wait an average time of:

$$t_{group} = \frac{kp}{2} \quad \quad 121.1$$

for the arrival of the periodic interval in which routing information for that group of sink nodes is sent from the node. This wait time is herein referred to as "group wait time" and is similar to the node wait time. The minimum group wait time approximates zero, and the maximum group wait time approximates kp.

Similar to the description earlier in the context of deviations from the average node wait time at each node, the deviation from the average group wait time of equation 121.1 at each node may also be treated as a stochastic event. This is because the transmission of groups are not synchronized between nodes. That is, the order in which the groups are transmitted is known, but the routing information from which of the group is first received by a node may be random. Therefore it is possible to calculate the probability that a subset of a known quantity of nodes, all have a group wait time that deviates from the average group wait time given in equation 121.1. More specifically, when the average group wait time is less than $$\frac{kp}{2}$$

it will fall in a range between 0 and $$\frac{kp}{2}$$

with the average group wait time being $$\frac{kp}{4}.$$

When the average group wait time is more than $$\frac{kp}{2},$$

it will fall in a range between $$\frac{kp}{2}$$

to kp, with the average group wait time being $$\frac{3kp}{4}.$$

Deviations at several nodes in the same direction away from the average group wait time will cause a lengthening or shortening of the travel time over a route.

Like in the context of node wait times, the table of FIG. 9 may be used to illustrate the results from calculations based on cumulative binominal probabilities. The table shows the probability of 1 or more to 6 or more (917) nodes deviating in the same direction away from the average group wait time over routes with lengths ranging from 12 to 30 nodes.

In reference to the example of FIG. 9, for a route with a length of 30 nodes, there is a probability of 0.1002 (919) that 4 nodes or more will deviate in the same direction from the average group wait time. Similarly, in view of a relatively close probability of 0.1052 (921) for a route with a length of 16 nodes, 3 nodes or more would deviate in the same direction from the average group wait time.

The probabilities from calculations based on cumulative binominal probabilities, as provided in FIG. 9, can be used for determining the overall probability that a given route would experience such deviations. More specifically, for a network that does not apply grouping of sink nodes (i.e., k=1) and for a route consisting of 16 nodes, based on the cumulative binominal distribution, the result is a probability of 0.11 that the group wait time will be lengthened by at least $$3\frac{1}{4}p = 0.75p.$$

However, for a network that groups sink nodes into 8 groups (i.e., k=8) and for a route consisting of 16 nodes, based on the cumulative binominal distribution, the result is a probability of 0.11 that the group wait time will be lengthened by at least $$3\frac{8}{4}p = 6p$$

In effect, when grouping is not used, as previously described, the deviations in node wait times from the average does not have a significant impact on the travel time over the route. However, when grouping is used, it will be appreciated that the impact on the travel time over a node due to deviations from the average group wait time is much more important.

The use of groups of sink nodes has the effect of slowing down the rate at Which more recent routing information is sent from each sink node by a factor of k. Accordingly, the rate at which nodes update their stored routing information to indicate a neighbor node representing the fastest route to a particular sink node is also slowed. Similarly, as previously discussed, the repetition of race numbers also slows down the rate at which more recent routing information is sent. Advantageously, the use of grouping of sink nodes in conjunction with repeating of race numbers does not compound to slow down the total rate at which more recent routing information is sent and received. Note however, for efficiency, the number of repetitions should be at least equal to the number of pages used, or a multiple thereof.

For example, in a situation where a sink node of a network is not repeating race numbers, but the sink nodes have been divided into k groups, a non-sink node directly connected to the sink node may be receiving every race number contained in the routing information received but will still only send routing information for the given sink node every k periodic intervals. Therefore, each transmission of routing period from the non-sink node will only contain every k'th race number. All other updates of its own race number that the sink may make to its own routing table between sending said race number are lost. In this case, even though the repetition rate is minimal, thereby allowing faster updates, these updates are still slowed down by the use of paging. Similarly, if the repetition rate r is greater than the number of pages, even though routing information for a given sink node may be sent every k periodic intervals; the same race number may be sent twice. Therefore, in one embodiment, the repetition rate and the number of pages are selected to be equal, such that neither mechanism slows down the rate at which more recent routing information is sent more than the other mechanism.

As discussed for embodiments where paging is not used, there is a deviation in travel time from the average travel time caused by the fact that start times of periods in which routing information is transmitted are selected at random. This was seen to be causing a potential for ambiguities in race numbers when two race numbers are compared, after having being propagated over a significant number of nodes. A similar, but amplified, effect is experienced when paging is used. Since the group wait times cause the time for routing information to propagate over a given route to be further lengthened, the potential for ambiguities in race numbers when comparing routing information becomes even greater. However, the effect caused by use of paging is fully mitigated if the number of times a race number is repeated is the same as the number of pages. It will be understood that the number of groups may also be selected according to the intended operation of the network. That is, if it is expected that the network topology may be quite dynamic, a smaller number of groups 1110 may be selected so as to provide for faster route updates at the expense of larger aggregated route messages. Conversely, if it is known that the deployment of non-sink nodes may be quite static (i.e. they will not be very mobile), then a larger number of groups may be selected so as to potentially reduce the speed of route updates while allowing for shorter transmissions of aggregated route information 1110. Generally, optimal parameter selection relies on balancing of the number of groups employed with the frequency in which routes are updated in view of the available computational and power resources. Various configurations that take into account these factors are within the contemplation of the subject embodiments.

The above described steps can be performed by the system implemented in hardware or software, or a combination of both. Each node comprises node memory, which stores the stored routing information of the node. Each node further comprises one node processor, which is configured to receive routing information sent from neighboring nodes, determine whether the routing information is more recent than the stored routing information at the node, storing received routing information, and sending updated routing information based on stored routing information stored in the node memory at a periodic interval.

Every node is configured to send routing information at a periodic interval. This routing information comprises an indicator of recency and allows identification of the sink node. Where the node is a sink node, the node is further configured to update the indicator of recency corresponding to itself when sending routing information. The update is done every period or every r'th period, r being a natural number greater than 1 and represents the repetition rate of race numbers.

It will also be understood that such routing information may be sent at any applicable layer of the protocol stack. Borrowing terminology from the Open System Interconnection (OSI) model known in the art, such messages may be sent in the data link layer (e.g., at the Media Access Control (MAC) layer), or in the network layer (e.g., using internet protocol (IP) addresses).

Further embodiments of the system and method of the present application can be implemented by reconfiguring the elements of this system without the need for additional elements.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the embodiments and non-limiting, and it will be understood by persons skilled in the art that other variants and modifications may be made without departing from the scope of the embodiments as defined in the claims appended hereto.

The invention claimed is:

1. A method of determining a route in a network, the method comprising:
sending routing information from a sink node at a periodic interval, the routing information comprising a race number as an indicator of recency and allowing identification of the sign node, a same race number being repeated at least once in routing information sent successively at the periodic interval;
sending routing information from each of a plurality of nodes at a periodic interval, the routing information being based on stored routing information at each of the plurality of nodes;
repeatedly receiving routing information at any node able to receive routing information;
determining at each node receiving routing information whether the received routing information is more recent than stored routing information at the node; and
if the received routing information at a node is more recent than the stored routing information, storing the received routing information at the node;
wherein the race number belongs to a subset of the integers; and wherein the size of the subset is selected based on the rate of repetition of the race number and the length of the longest chordless cycle of the topology of the network.

2. The method of claim 1, wherein the race number is represented by one bit.

3. The method of claim 2, the method further comprising:
storing at each node the last race number received from each of one or more neighbor nodes of each of the nodes; and
if there is a change in the race number contained in routing information received at the node from a first neighbor node after receiving the same race number from each of the one or more neighbor nodes, determining the received routing information to be more recent.

4. The method of claim 1, wherein the routing information sent from each of a plurality of nodes comprises a plurality of race numbers as indicators of recency corresponding to a plurality of sink nodes.

5. A non-transitory computer-readable medium upon which a plurality of instructions are stored, the instructions for performing the steps of the method as claimed in claim 1.

6. The method of claim 1, wherein the size of the subset is selected according to:

$$rL \geq c\left(\frac{1}{2}h - 1\right) \text{ and } L = \frac{N-1}{2}$$

wherein r is the repetition rate of race number, c is a compensating factor, h is the length of the longest chordless cycle of nodes in the network and N is the size of the subset of the integers.

7. A system for establishing a route in a network, the system comprising:
a plurality of nodes, each node comprising:
a node memory; and
a node processor, the node processor configured to:
send routing information at a periodic interval, the routing information being based on information stored in the node memory;
receive routing information;
determine whether the received routing information is more recent than the stored routing information at the node; and
if the received routing information is more recent than stored routing information, to store the received routing information in the node memory;

wherein at least one of the nodes is a sink node, the processor of the sink node further configured to:
send routing information at a periodic interval, the routing information comprising a race number as an indicator of recency and allowing identification of the sink node, a same race number being repeated at least once in routing information sent successively at the periodic interval;
wherein the race number belongs to a subset of the integers; and
wherein the size of the subset is selected based on the rate of repetition of the race number and the length of the longest chordless cycle of the topology of the network.

8. The system of claim 7, wherein the race number is represented by one bit.

9. The system of claim 8, wherein the node processor is further configured to:
store at each node the last race number received from each of one or more neighbor nodes of each of the nodes; and
if there is a change in the race number contained in routing information received at the node from a first neighbor node after receiving the same race number from each of the one or more neighbor nodes, determine the received routing information to be more recent.

10. The system of claim 7, wherein node processor is further configured to send routing information at a periodic interval, the routing information comprising a plurality of race numbers as indicators of recency corresponding to a plurality of sink nodes.

11. The system of claim 7, wherein the size of the subset is selected according to:

$$rL \geq c\left(\frac{1}{2}h - 1\right) \text{ and } L = \frac{N-1}{2}$$

wherein r is the repetition rate of race number, c is a compensating factor, h is the length of the longest chordless cycle of nodes in the network and N is the size of the subset of the integers.

12. A method of determining a route in a network, the method comprising:
sending routing information from a sink node at a periodic interval, the routing information comprising a race number as an indicator of recency and allowing identification of the sink node, a same race number being repeated at least once in routing information sent successively at the periodic interval;
sending routing information from each of a plurality of nodes at a periodic interval, the routing information being based on stored routing information at each of the plurality of nodes;
repeatedly receiving routing information at any node able to receive routing information;
determining at each node receiving routing information whether the received routing information is more recent than stored routing information at the node; and
if the received routing information at a node is more recent than the stored routing information, storing the received routing information at the node;
wherein sending routing information from a sink node comprises sending at a first periodic interval routing information comprising a first group identifying field and one or more race numbers as indicators of recency corresponding to a first group of one or more sink nodes and sending at a second periodic interval routing information comprising a second group identifying field and one or more race numbers as indicators of recency corresponding to a second group of one or more sink nodes, wherein each of the one or more sink nodes of the first group are identified based on the first group identifying field and the position of each of the one or more race numbers within the routing information sent at the first periodical interval and each of the one or more sink nodes of the second group are identified based on the second group identifying field and the position of each of the one or more race numbers within the routing information sent at the second periodical interval.

13. The method of claim 12, wherein the race number is represented by one bit.

14. The method of claim 13, the method further comprising:
storing at each node the last race number received from each of one or more neighbor nodes of each of the nodes; and
if there is a change in the race number contained in routing information received at the node from a first neighbor node after receiving the same race number from each of the one or more neighbor nodes, determining the received routing information to be more recent.

15. The method of claim 12, wherein a same first race number corresponding to one of the sink nodes of the first group sent successively at the first periodic interval is repeated a number of times that is equal to the number of sink nodes in the first group and wherein a same second race number corresponding to one of the sink nodes of the second group sent successively at the second periodic interval is repeated a number of times that is equal to the number of sink nodes in the second group.

16. A non-transitory computer-readable medium upon which a plurality of instructions are stored, the instructions for performing the steps of the method as claimed in claim 12.

17. A system for establishing a route in a network, the system comprising:
a plurality of nodes, each node comprising:
a node memory; and
a node processor, the node processor configured to:
send routing information at a periodic interval, the routing information being based on information stored in the node memory;
receive routing information;
determine whether the received routing information is more recent than the stored routing information at the node; and
if the received routing information is more recent than stored routing information, to store the received routing information in the node memory;
wherein at least one of the nodes is a sink node, the processor of the sink node is further configured to: send routing information at a periodic interval, the routing information comprising a race number as an indicator of recency and allowing identification of the sink node, a same race number being repeated at least once in routing information sent successively at the periodic interval; and
wherein the node processor is further configured to send at a first periodic interval routing information comprising a first group identifying field and one or more race numbers as indicators of recency corresponding to a first group of one or more sink nodes and to send at a second periodic interval routing information comprising a second group identifying field and one or more race numbers as indicators of recency corresponding to a second group of one or more sink nodes, wherein each of the one or more sink nodes of the first group are identified based on the first group identifying field and the position of each of the one or more race numbers within the routing information sent at the first periodical interval and each of the one or more sink nodes of the second group are identified based on the second group identifying field and the position of each of the one or more race numbers within the routing information sent at the second periodical interval.

18. The system of claim 17, wherein the race number is represented by one bit.

19. The system of claim 18, wherein the node processor is further configured to:
- store at each node the last race number received from each of one or more neighbor nodes of each of the nodes; and
- if there is a change in the race number contained in routing information received at the node from a first neighbor node after receiving the same race number from each of the one or more neighbor nodes, determine the received routing information to be more recent.

20. The system of claim 17, wherein a same first race number corresponding to one of the sink nodes of the first group sent successively at the first periodic interval is repeated a number of times that is equal to the number of sink nodes in the first group and wherein a same second race number corresponding to one of the sink nodes of the second group sent successively at the second periodic interval is repeated a number of times that is equal to the number of sink nodes in the second group.

\* \* \* \* \*